United States Patent
Dykstra

(10) Patent No.: US 7,620,481 B2
(45) Date of Patent: Nov. 17, 2009

(54) SYSTEMS FOR SELF-BALANCING CONTROL OF MIXING AND PUMPING

(75) Inventor: Jason D. Dykstra, Addison, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 366 days.

(21) Appl. No.: 11/803,151

(22) Filed: May 11, 2007

(65) Prior Publication Data

US 2008/0165613 A1 Jul. 10, 2008

Related U.S. Application Data

(60) Provisional application No. 60/879,746, filed on Jan. 10, 2007.

(51) Int. Cl.
G05D 7/00 (2006.01)
G06F 17/00 (2006.01)
G05B 21/00 (2006.01)
B28C 7/04 (2006.01)
B01F 15/04 (2006.01)

(52) U.S. Cl. .................. 700/285; 700/239; 700/265; 366/8; 366/16; 366/160.1

(58) Field of Classification Search ............... 700/239, 700/265, 282, 285; 366/2–4, 6, 10, 16, 136, 366/153.1, 160.1, 162.1, 8; 166/285; 137/565.01, 137/565.11; 175/48; 702/45, 50
See application file for complete search history.

(56) References Cited

U.S. PATENT DOCUMENTS

| | | | | |
|---|---|---|---|---|
| 3,599,668 A * | 8/1971 | Ricardi | ................ | 137/565.12 |
| 4,834,542 A * | 5/1989 | Sherwood | ................ | 366/21 |
| 5,027,267 A * | 6/1991 | Pitts et al. | ................ | 700/67 |
| 5,103,908 A * | 4/1992 | Allen | ................ | 166/285 |
| 5,114,239 A * | 5/1992 | Allen | ................ | 366/6 |
| 6,105,689 A * | 8/2000 | McGuire et al. | ................ | 175/48 |
| 6,216,690 B1 * | 4/2001 | Keitel et al. | ................ | 128/203.12 |
| 6,227,221 B1 * | 5/2001 | Schmitz | ................ | 137/1 |
| 6,378,628 B1 * | 4/2002 | McGuire et al. | ................ | 175/48 |
| 7,108,069 B2 * | 9/2006 | Killie et al. | ................ | 166/336 |
| 7,258,164 B2 * | 8/2007 | Rezgui et al. | ................ | 166/68.5 |
| 7,366,621 B2 * | 4/2008 | Sprague | ................ | 702/45 |
| 7,502,695 B2 * | 3/2009 | DeVries et al. | ................ | 702/50 |
| 2006/0104154 A1 * | 5/2006 | Inoue et al. | ................ | 366/96 |
| 2006/0176640 A1 | 8/2006 | Dykstra | | |

(Continued)

*Primary Examiner*—Crystal J Barnes-Bullock
(74) *Attorney, Agent, or Firm*—John W. Wustenberg; Groover & Associates

(57) ABSTRACT

Systems for controlling the in-feed and discharge rates of materials flowing into and out of a mixing process where one priority is to achieve a target mixture flow rate from the mixing process and another priority can be to achieve a target value for a mixture property. Actuators can be operated to control material in-feed rates, the mixture composition, and discharge rate, and can maintain a hold-up of the mixture in the mixing process. A total flow rate controller provides a control signal to a controller acting on the discharge rate and a controller acting on the in-feed rates. The mixture discharge flow rate can be automatically reduced from its desired target when the commanded rate of at least one of the materials exceeds its available supply rate as inferred from an inability to maintain the targeted value for the mixture property.

26 Claims, 15 Drawing Sheets

U.S. PATENT DOCUMENTS

2006/0177203 A1 8/2006 Dykstra
2006/0231259 A1 10/2006 Dykstra et al.
2006/0233039 A1 10/2006 Dykstra et al.
2006/0235627 A1 10/2006 Dykstra et al.

* cited by examiner

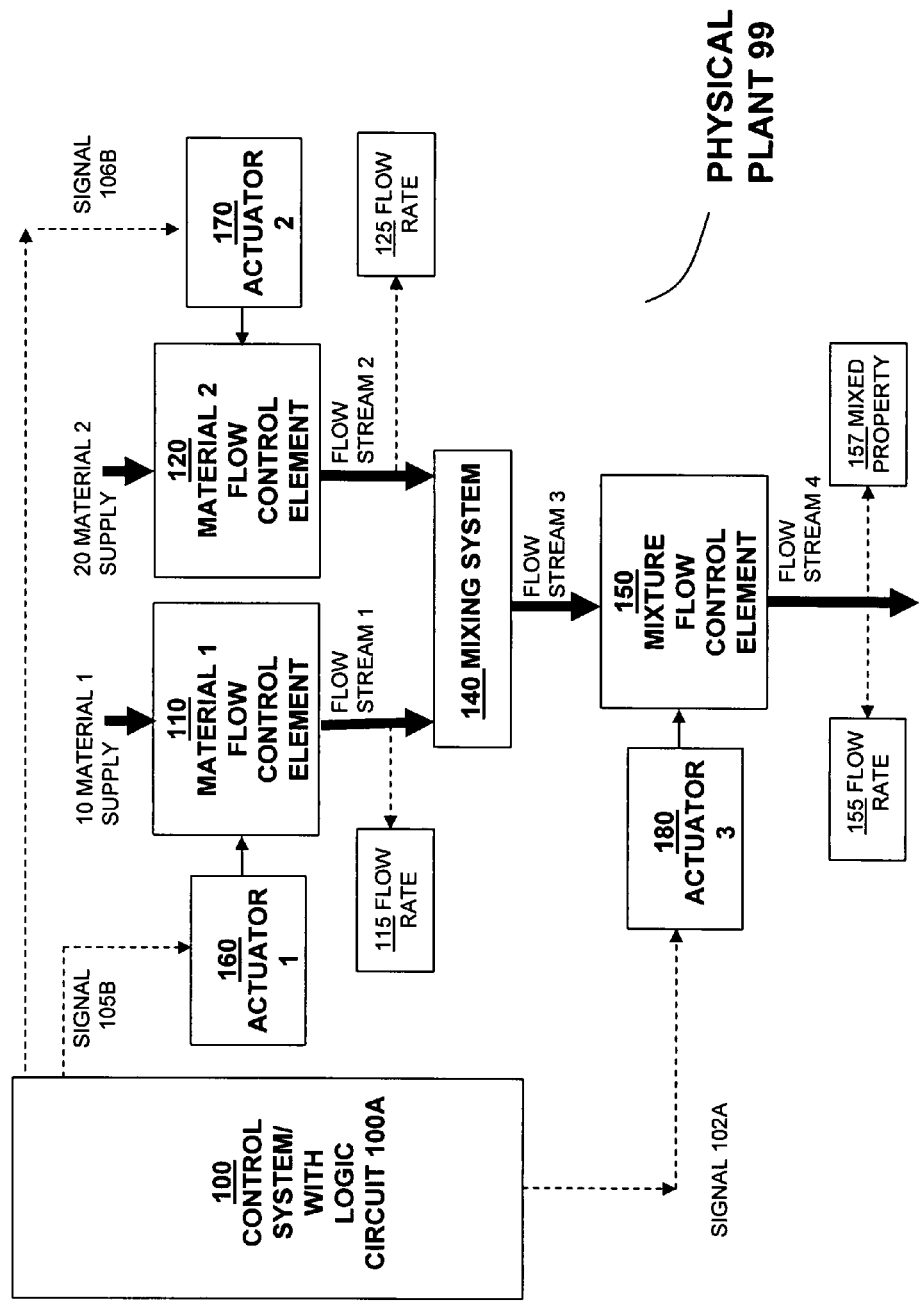

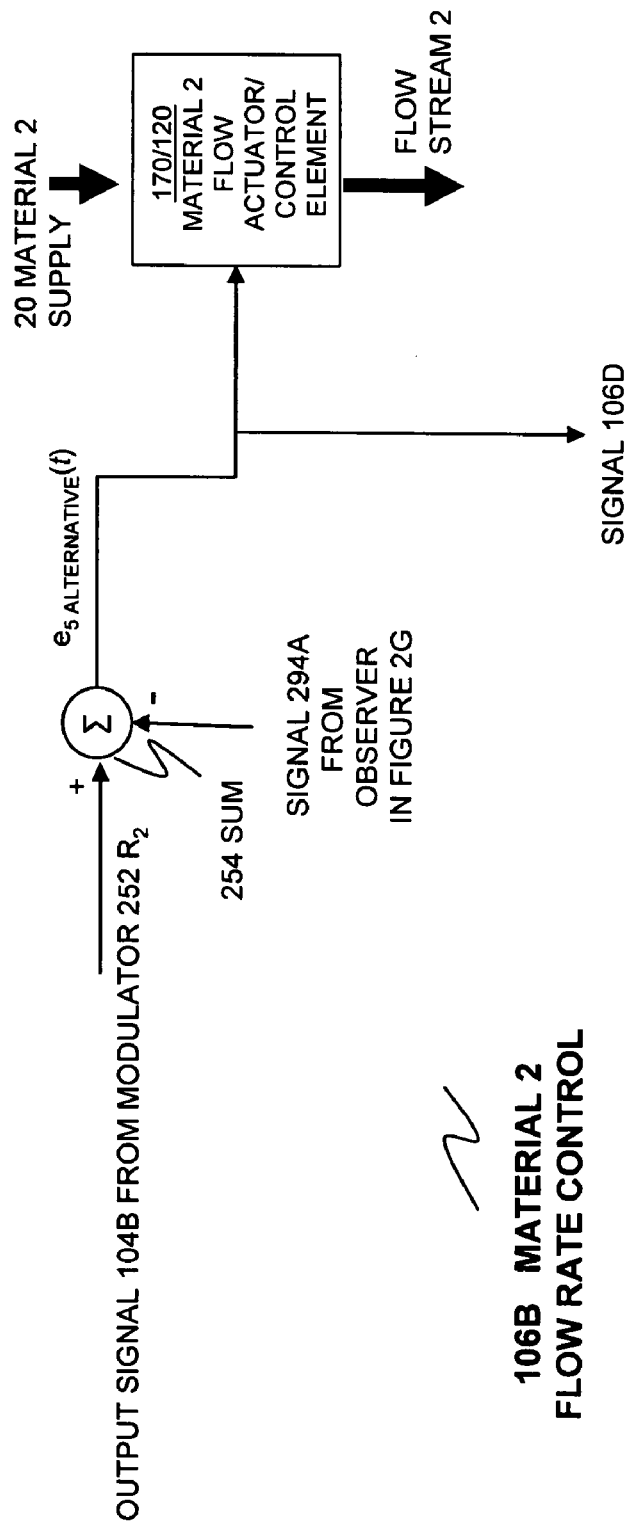

SYSTEMS FOR SELF-BALANCING CONTROL OF MIXING AND PUMPING

CROSS-REFERENCE TO RELATED APPLICATIONS

This application claims priority from U.S. Provisional Patent Application 60/879,746 filed on Jan. 10, 2007, entitled "Methods and Systems for Self-Balancing Control of Mixing and Pumping", to Jason D. Dykstra, which is herein incorporated by reference in its entirety.

The following application filed concurrently herewith is not necessarily related to the present application, but is incorporated by reference herein in its entirety: "Systems for Self-Balancing Control of Mixing and Pumping", U.S. patent application Ser. No. 11/803,149, filed simultaneously with the effective filing date of the present application, Attorney Docket Number HES-2006-IP-022199U1).

The following applications are incorporated by reference herein in their entirety: "Methods of Determining a Volumetric Ratio of a Material to the Total Materials in a Mixing Vessel", U.S. patent application Ser. No. 11/323,831, now U.S. Pat. No. 7,567,856, to Jason D. Dykstra and Justin A. Borgstadt, filed Dec. 30, 2005; "Systems for Determining a Volumetric Ratio of a Material to the Total Materials in a Mixing Vessel", U.S. patent application Ser. No. 11/323,323, to Jason D. Dykstra and Justin A. Borgstadt, filed Dec. 30, 2005; "Systems of Volumetrically Controlling a Mixing Apparatus," U.S. patent application Ser. No. 11/323,322, now U.S. Pat. No. 7,561,943, to Jason D. Dykstra and Justin A. Borgstadt, filed Dec. 30, 2005; "Methods of Volumetrically Controlling a Mixing Apparatus," U.S. patent application Ser. No. 11/323,324, to Jason D. Dykstra and Justin A. Borgstadt, filed Dec. 30, 2005; "Method for Servicing a Well Bore Using a Mixing Control System," U.S. patent application Ser. No. 11/121,325, now U.S. Pat. No. 7,353,874, to Jason D. Dykstra and Justin A. Borgstadt, filed May 3, 2005, U.S. Patent Application Publication Number 2006/0231259; "Methods and Systems for Estimating Density of a Material in a Mixing Process," U.S. patent application Ser. No. 11/121,144, now U.S. Pat. No. 7,308,379, to Jason D. Dykstra and Justin A. Borgstadt, filed May 3, 2005, U.S. Patent Application Publication Number 2006/0235627; "Control System Design for a Mixing System with Multiple Inputs," U.S. patent application Ser. No. 11/121,278, now U.S. Pat. No. 7,494,263, to Jason D. Dykstra and Justin A. Borgstadt, filed May 3, 2005, U.S. Patent Application Publication Number 20060233039; "Methods for Controlling Multiple Actuators," U.S. patent application Ser. No. 11/053,474, now U.S. Pat. No. 7,433,762, to Jason D. Dykstra, filed Feb. 8, 2005, U.S. Patent Application Publication Number 20060177203; and "Systems for Controlling Multiple Actuators," U.S. patent application Ser. No. 11/053,139, now U.S. Pat. No. 7,392,113, filed Feb. 8, 2005, U.S. Patent Application Publication Number 2006/0176640.

BACKGROUND AND SUMMARY OF THE INVENTION

The present disclosure is directed to control systems for mixing and pumping systems, and more particularly, but not by way of limitation, to control systems for well service fluids, well cement preparation, and well fluid delivery systems used in hydrocarbon well bore servicing applications.

A control system typically comprises one or more physical system components employing a logic circuit that cooperate to achieve a set of common process results. In a mixing and pumping operation, the objectives can be to achieve a particular composition and flow rate for the resulting mixture.

The control system can be designed to reliably control the physical system components in the presence of external disturbances, variations among physical components due to manufacturing tolerances, and changes in inputted set-point values for controlled output values. Control systems usually have at least one measuring device, which provides a reading of a process variable, which can be fed to a controller, which then can provide a control signal to an actuator, which then drives a final control element acting on, for example, a flow stream. Examples of a of final control elements include flow control valves and speed controlled pumps.

The control system can be designed to remain stable and avoid oscillations within a range of specific operating conditions. A well-designed control system can significantly reduce the need for human intervention, even during upset conditions in an operating process.

In a hydrocarbon well bore servicing process, a control system can be used when mixing materials to achieve a desired mixture composition and flow rate. For example, when drilling an oil or gas well, it is common to install a tubular casing into the well bore and to cement the casing in place against the well bore wall. A cement mixing system that supports well bore servicing operations can be designed with a control system configured to provide a desired volumetric or mass flow rate of mixed cement having a desired density or composition in order to achieve desired properties of the cured cement. In particular, the cement mixing control system can control valves to regulate the in-flow of dry cement material and water into a mixing system to obtain the desired cement mixture density and desired cement mixture volumetric or mass flow rate out of the mixing system. The control system can operate, for example, by monitoring the cement mixture flow rate and density, and by regulating an in-flow water control valve and an in-flow dry cement material control valve. But sometimes, the amount of instrumentation available at well service sites is limited. For example, a water flow meter can be routinely present because measuring devices such as turbine meters or Coriolis mass flow meters are reliable and easy to maintain. However, solids flow meters, such as a weigh belt feeder, are much more difficult to service and to keep in calibration. Thus, such solids flow measuring devices are often not present. So, the control system is faced with a challenge as to how to monitor flow rates of a powdered solid, such as cement, without actually measuring the flow rate.

During a well bore cementing operation, the mixed cement is pumped down-hole at a target rate. Sometimes, supply of a particular component can get interrupted momentarily or constrained somehow (e.g. a supply constraint), and can cause a control disturbance to an automatic control system controlling the supply valve actuators and pumping system. For example, dry cement can be supplied from unitized storage systems, e.g. "pods", that require change-over when they become empty, and thus, momentary interruption of the supply of dry cement can occur. For another example, the flow rate of a particular material can be unintentionally and/or unknowingly restricted due to a partial blockage of a supply line. For example, dry cement can pick-up moisture and begin to coat the interior of pipes, or collect at conduit elbows or valves, resulting in a restriction.

One skilled in the art of hydrocarbon well serving can appreciate the volume and speed at which well service fluids are prepared and pumped down-hole in a substantially time-sensitive manner with little or no chance to correct an error, since, for example, a slug of defectively-mixed cement can end-up a mile or more underground. When a supply interruption or constraint occurs, the control system can be faced with a challenge, especially when limited flow rate information is available, as to how to best react to balance quality control of the service fluid, e.g. density control, and the required supply rate, e.g. barrels per minute of fluid demanded down-hole.

Accordingly, a need exists for a mixing control system and a mixing control method that partially couples the effects of changes in the supply availability of the materials to be mixed with the desired supply rate and desired quality of the final mixture.

Systems for Self-Balancing Control of Mixing and Pumping

Control systems for the continuous mixing of at least two materials. A control system comprises at least a first actuator and a second actuator, each operable to control the flow rate of a material into a mixing process. The control system also has a third actuator operable to control the discharge rate of the mixture flow stream leaving the mixing process, and a logic circuit operating at least the three actuators. The logic circuit receives a desired target for a particular property of the mixture flow stream and a desired target for the discharge rate of the mixture flow stream. The logic circuit operates at least the first and second actuators to maintain the property of the mixture discharge flow stream at the desired target value. The logic circuit operates the third actuator to maintain the discharge rate of the mixture flow stream at the desired flow rate but can adjust the discharge rate based on the occurrence of a material supply constraint for the material flowing through either or both of the first and second actuators. A material supply constraint can be a limitation in the availability of supply of the materials.

In some embodiments (but not necessarily all), the disclosed ideas are used to control the mixing and pumping of hydrocarbon well service fluids.

In some embodiments (but not necessarily all), the disclosed ideas are used to control the mixing and pumping of cement for cementing a casing to a hydrocarbon well bore.

In some embodiments (but not necessarily all), the disclosed ideas are used to control the mixing and pumping of fracturing and propping fluids for performing a subterranean fracturing process for a hydrocarbon well.

In some embodiments (but not necessarily all), the disclosed ideas are used to control at least one property of a fluid mixture flow stream to a desired target as a first priority where the desired target flow rate of the stream is also maintained at target, but is adjusted in response to supply constraints within the physical system.

The disclosed innovations, in various embodiments provide one or more of at least the following advantages:
Improved control of the physical properties of well service fluids resulting in improved consistency of the quality of such fluids being pumped down-hole during a well service operation;
Reduced labor for preparation and supply of well service fluids;
Reduced uncertainty in the operation of well service fluid supply systems; and/or
Reduced dependency on human intervention and decision-making during well service fluid supply.

These and other features and advantages will be more clearly understood from the following detailed description taken in conjunction with the accompanying drawings and claims.

BRIEF DESCRIPTION OF THE DRAWINGS

The disclosed innovations will be described with reference to the accompanying drawings, which show important sample embodiments of the invention and which are incorporated in the specification hereof by reference.

FIG. 1A is a diagram of one embodiment of a physical plant embodiment within which a control system and a control method for a mixing and pumping system can be implemented and which can benefit from one or more of the present innovations.

FIG. 2E shows a block diagram of a preferred embodiment of systems and methods for flow rate control for a second material according to the present innovations.

DETAILED DESCRIPTION OF THE PREFERRED EMBODIMENTS

The numerous innovative teachings of the present application will be described with particular reference to the presently preferred embodiment (by way of example, and not of limitation).

Figure 1:
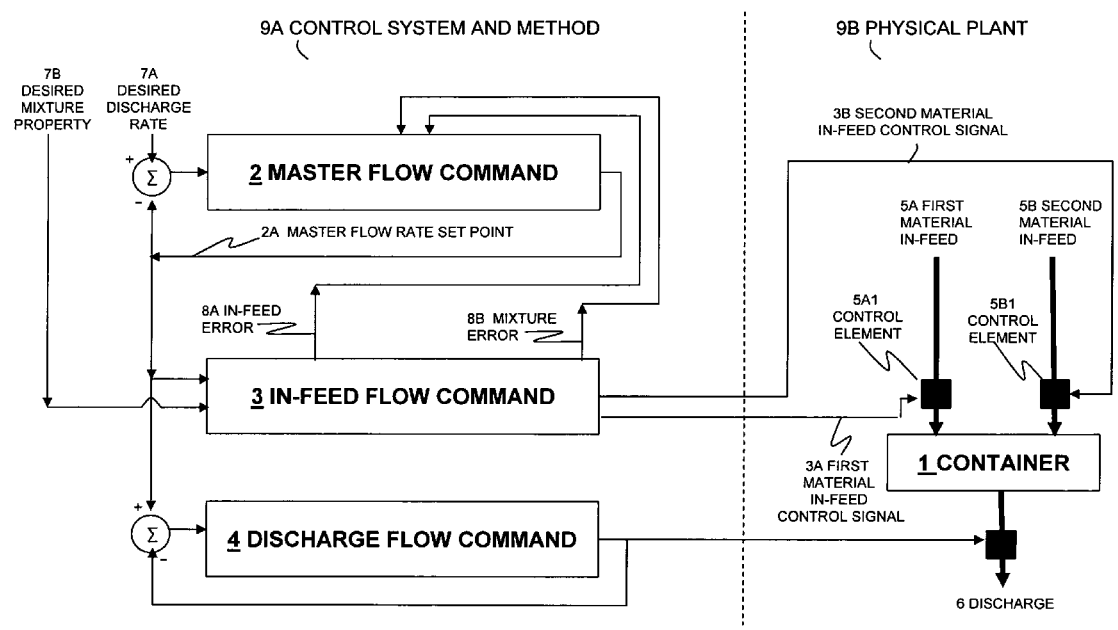
FIG. 1 is one embodiment of the present innovations.

FIG. 1 shows one embodiment of the present innovations comprised of control system and method 9A and physical plant 9B. A desired discharge flow rate 7A can be inputted into control system and method 9A for the mixture discharge flow rate out of container 1. A desired value for a property of the mixture 7B can be inputted as well.

Master flow command 2 can provide a master flow rate set point control signal 2A to in-feed flow command 3 and discharge flow command 4 based at least on the difference between the desired rate 7A and the master flow rate setpoint 2A. In-feed flow command 3 can provide master flow command an indication of the in-feed error 8A, of at least a first material, based on, for example, the difference between the present in-feed flow rate and the present master flow rate set point 2A. In-feed flow command 3 can provide master flow command an indication of the mixture property error 8B, based at least on the difference between the desired mixture property value 7B and a sensed property value. Master flow command can adjust the master flow rate setpoint in part based on the indications 8A and 8B.

Command stage 3 can provide in-feed flow rate control signals 3A and 3B to the actuators 5A1 and 5B1 and/or final control elements controlling in-feeds 5A and 5B to control the resulting mixture property 6. This is done by varying the relative values of the signals. Stage 3 can also control the total flow rate into the container by adjusting the values up or down while maintaining the ratio of the signals. By employing master flow rate command stage 2, constraints in the supply of materials to container 1 can be quickly reflected in a reduction of the flow rate out of the container.

FIG. 1A shows a physical plant 99 to which the present innovations can be applied. An element of the physical plant can be mixing system 140. In one embodiment, system 140 can be a simple mixing tank with an agitator, along with the necessary piping, electrical, material transport, and structural components as known to one skilled in the art of mixing. In another embodiment, the mixing system can consistent of two or more tanks in series, in parallel, or in various arrangements. The mixing system can be an atmospheric pressure system or a system under pressure or vacuum. The mixing system can be for two or more fluids, two or more solids, one fluid and one solid, or various combinations thereof. A preferred embodiment is one fluid as "material 1" and one flowable particulated solid as "material 2." In the preferred embodiment, the mixture resulting from system 140 is a solid-liquid slurry or mixture (flow stream 3), such as mixed cement.

Another element of the plant can be mixture flow control element 150. In a preferred embodiment, system 150 is a flow-controlled pump such as a speed-controllable positive displacement pump or a centrifugal pump, with a flow control valve. Other kinds of pumps can also be utilized including gear pumps, lobe pumps, peristaltic pumps, vane pumps, piston pumps, progressive cavity pumps, plunger pumps, or various combinations thereof. In other embodiments, element 150 can be a screw conveyor or a belt conveyor for the control of solids flow. Other kinds of solids flow control devices can be used including rotary valves, slide gates, screw feeders, augers, or various combinations thereof. For gases and vapors, element 150 can be a speed-controlled compressor or a flow control valve.

The flow discharge rate from mixing system 140 can be controlled by element 150 which receives and controls the discharge of system 140 in its entirety. Thus, the flow rate at location 155 can be the same as the mixing system discharge flow rate (e.g. flow stream 3) and the mixed property at location 157 for flow stream 4 has substantially the same value as that discharging from system 140 for flow stream 3.

Material flow control elements 110 and 120 can be flow control valves which receive materials from material supplies 10 and 20, respectively. In the case of solids, elements 110 and 120 can, again, be screw or belt conveyors, or other solids flow control devices known to one skilled in the art of solids handling. In a preferred embodiment, element 110 is a water flow control valve and element 120 is a dry powder flow control valve.

In a preferred embodiment material 1 is water and supply 10 is a source of water, such as a supply tank or supply pipe. In a preferred embodiment, material 2 is a dry cement powder and supply 20 is a bin (e.g. pod) of cement powder. Supply 20 can also be a hopper car of dry powdered cement. In a preferred embodiment, the mixture is mixed (wet and flowable) cement. Other kinds of materials and mixtures can benefit from the present innovations including sea water, re-used process water, carrier fluid, dry cement material, sand, fluid rheology modifying materials, cement property modifying materials, cement accelerators, fracturing fluids, proppant fluids, acidizing fluids, flushing fluids, drilling mud components, and proppants, or various combinations thereof.

The present innovations can include actuators 160, 170, and 180. Actuators can convert signals from control systems into actions such as movement of a control valve shaft or the change of speed of a pump. Signals to actuators can at least be electrical, pneumatic, hydraulic, acoustic, or electromagnetic radiation, or various combinations thereof. Actuators can at least be of various kinds, including variable speed motors, variable speed drives, pneumatic actuators, electrical actuators, hydraulic actuators, rotary actuators, servo motor actuators, or various combinations thereof.

Mixed property 157 can be a determination, sensing, or measurement of the property of mixture being controlled by the relative proportions of at least material 1 and material 2. Various properties can be controlled, including density, material volume ratio, and weight or volume fraction of a material in the mixture, or various combinations thereof. Other properties can be indirectly controlled where such properties are dependent on, related to, or indicated by, say, the density of the mixture. For example, the viscosity of a cement slurry can be related to the density of the slurry. More importantly, the composition of the cement is related to the density of the cement.

The present innovations can include a logic circuit 100A which is embodied in a control system such as system 100. The present innovations can use the logic circuit to operate at least actuators such as actuators 160, 170, and 180.

Figure 1B:
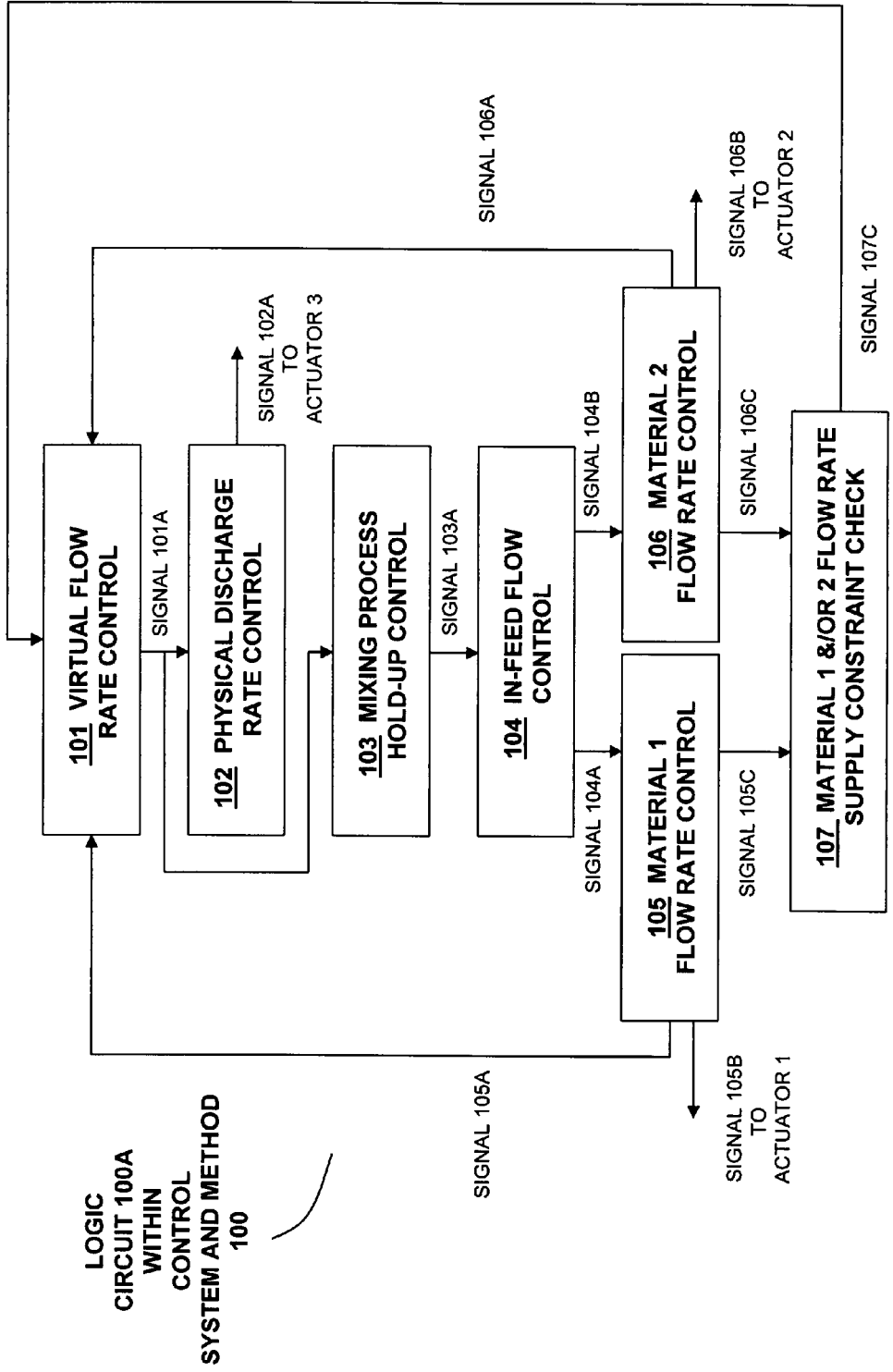
FIG. 1B shows a diagram of one embodiment of the methods of the present innovations.

Turning now to FIG. 1B, one embodiment of the present innovations for the logic circuit 100A within the control system 100 of FIG. 1A is shown. In this embodiment, the flow rate control of element 150 can be effected by physical discharge rate control stage 102. Stage 102 can send control signal 102A to control actuator 3 e.g. element 180. Stage 102 can receive a flow rate command signal 101A from virtual discharge rate control stage 101.

Stage 101 can represent a virtual flow rate control system that can receive multiple inputs, perform calculations, and output a virtual flow rate command signal 101A that is acted upon by other control actions. At a particular moment, the virtual rate from stage 101 can be different than the actual present physical discharge rate as commanded by stage 102, such as immediately after a disturbance to the physical plant of FIG. 1A. However, at steady state, the virtual rate and the actual discharge rate can be equal.

Mixing process hold-up control stage 103 can control the amount of materials contained in mixing system 140 as they are mixed. As the mixture is discharged from system 140, the level in the system, for example, can drop. In the case of a fluid mixing and pumping system, for example, the pump must usually have a steady supply of fluid readily available to keep the pump primed with fluid. Otherwise, the pump can become "starved" and can begin to malfunction, cavitate, and/or not act as a reliable control element. Thus, it is desirable to maintain a hold-up of a fluid mixture in a mixing vessel (from which the pump is drawing from) to keep the pump "charged" with the mixture. As the level, for example, drops below a desired hold-up (e.g. the hold-up set point) in mixing system 140, control stage 103 can send a signal 103A to stage 104 to call for more in-feed of material 1 and material 2, for example. If the level increases above set point, then stage 103 can call for less in-feed.

In-feed flow control stage 104 also controls the relative values of individual material flow rates to mixing system 140 and thus can control the value of a property of the mixture to a desired set point. Mixture properties can be a physical property such as density or viscosity, or a compositional property such as percent solids or percent content of a particular component, as previously described. Stage 104 generally can act to control the ratio of the flow streams of a first and a second material. For example, if the property to be controlled is density, and the mixture is a two component mixture where each component has a different density, then stage 104 can effect the necessary ratio of the components by using knowledge of the density behavior of the mixture as related to composition. Stage 104 can output signal 104A to material 1 flow rate control stage 105 and signal 104B to material 2 flow rate control stage 106. As the demand for in-feed is increased and decreased by stage 103, stage 104 can maintain the ratio of materials 1 and 2.

Material 1 flow rate control stage 105 can signal actuator 1 eg. element 160 to increase or decrease the flow rate of material 1 using signal 105B. Material 2 flow rate control stage 106 can signal actuator 2 eg. element 170 to increase or decrease the flow rate of material 2 using signal 106B.

Both stage 105 and 106 can signal virtual rate controller 101 with an indication of the error between the amount of flow actually in-feeding into mixing system 140 and the amount of material actually called for by stage 104, using signals 105A and 106A, respectively. In a preferred embodiment, where material 1 is water and material is a dry cement powder, only signal 105A is fed back to stage 101.

Both stage 105 and 106 can signal supply constraint check stage 107 using signals 105C and 106C, respectively. Stage 107 can check to insure that enough supply is present in material supplies 10 and 20. In a preferred embodiment where material 1 is water and material 2 is dry cement powder, and the mixture property being controlled is density, stage 107 infers that the supply of dry cement powder is constrained when the actual density falls below an estimated density (from an observer). In that event, stage 107 can send signal 107A to stage 101, which will act to signal stage 102 to slow-down the discharge rate, which will result in a slow down of the demand for both material 1 and material 2, until the desired density can be achieved because the available supply of material 2 becomes sufficient to meet the called-for supply by stage 106.

Figure 2A:
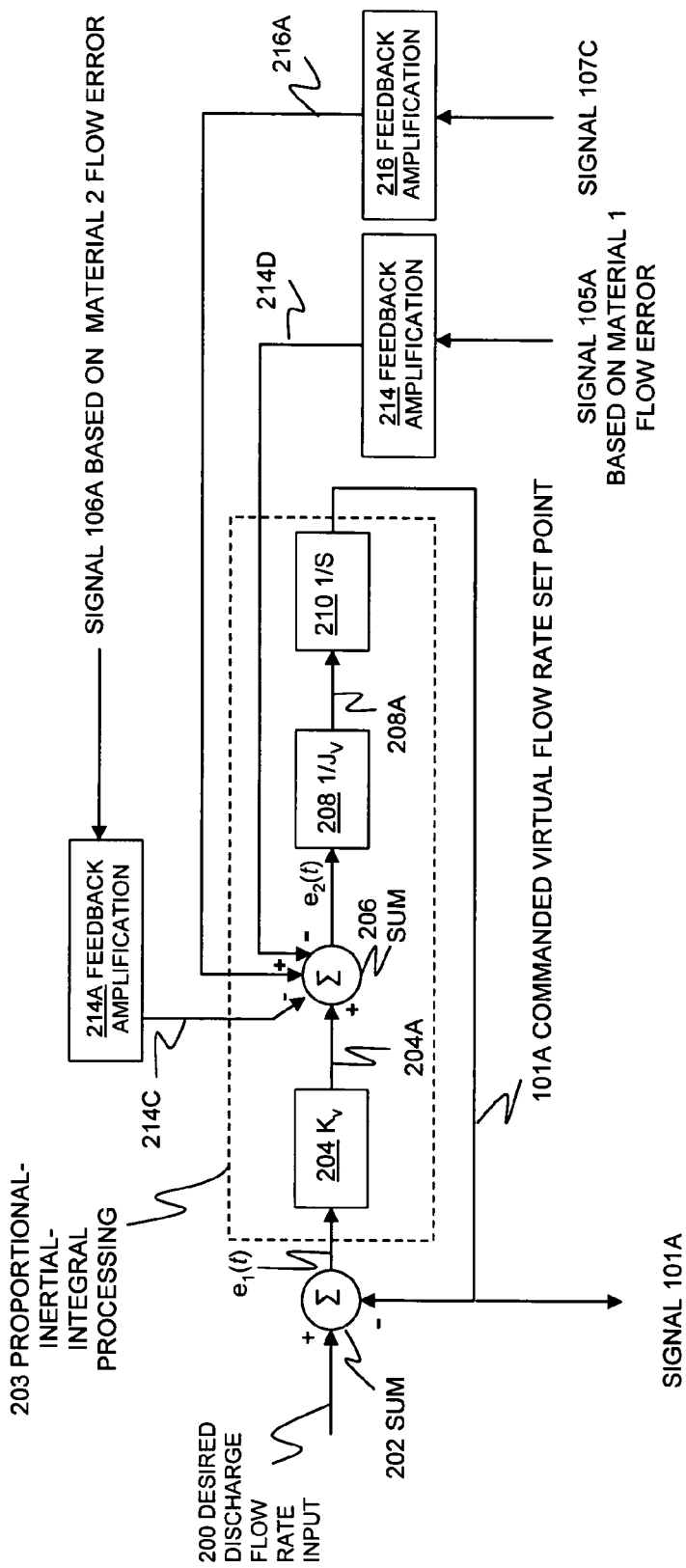
FIG. 2A shows a block diagram of a preferred embodiment of the virtual flow rate control systems and methods of the present innovations.

Turning now to FIG. 2A, a block diagram shows processing details of one embodiment of virtual flow rate control stage 101. A first summation stage 202, represented by the $\Sigma$ symbol within a circle (as is conventional in mathematical and control notation), can determine a first error term $e_1(t)$, by negatively summing the commanded virtual flow rate 210A with mixture discharge flow rate desired value input 200. Specifically, the inputs into a summing stage associated with a "+" (plus) sign are positively summed, while the inputs associated with a "−" (minus) sign are negatively summed. The output of first summation stage 202, namely first error term $e_1(t)$, can then be processed by a "Proportional-Inertial-Integral" processing operation 203 having a gain, $K_v$, for a proportional stage 204, an inertia constant $J_v$ for an inertial damping stage 208, and an integration stage 210, represented by 1/S inside the box, as is conventional in control system art to suggest integration. After multiplication of $e_1(t)$ by gain $K_v$, stage 204 can output signal 204A to summing stage 206 where it can be summed with amplified feedback 214C from feedback amplification stage 214A which received signal 106A based on a material 2 flow rate error, with amplified feedback 214D from feedback amplification stage 214 which received signal 105A based on a material 1 flow rate error, and from feedback amplification stage 216 which produced signal 216A from signal 107C indicating a material supply constraint. Stage 206 can output a second error term, $e_2(t)$ to inertial damping stage 208, which multiples $e_2(t)$ by $1/J_v$. Stage 208 can output signal 208A to integration stage 210, which integrates and outputs the commanded virtual flow rate signal 210A, for both feedback to summing stage 202 and feed-forward to other control stages.

Figure 2B:
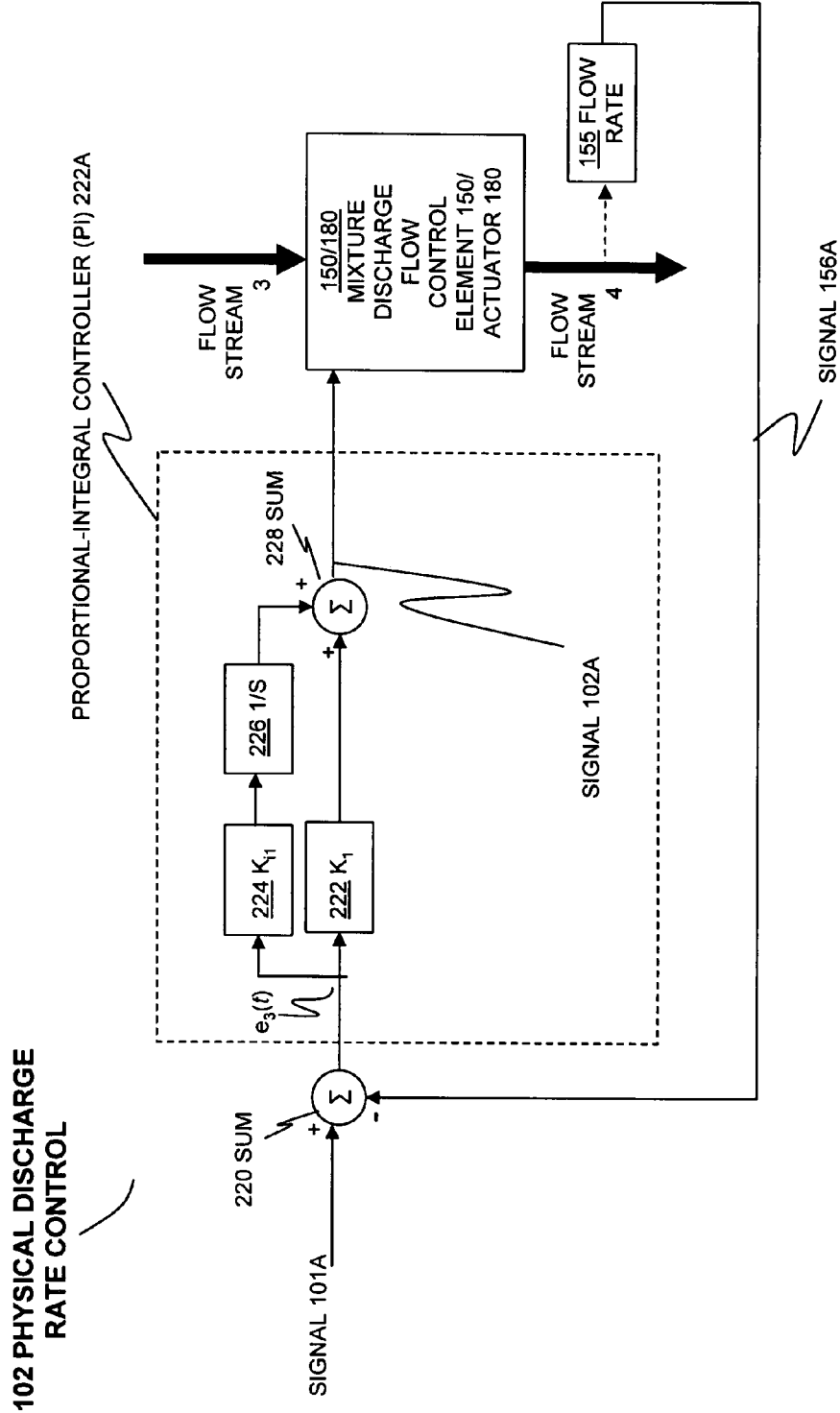
FIG. 2B shows a block diagram of a preferred embodiment of the physical discharge rate control systems and methods of the present innovations.

Turning now to FIG. 2B, a block diagram shows one embodiment to effect physical discharge rate control 102 from mixing system 140 using mixture flow control element 150. In FIG. 2B, a third summation stage 220 can determine a third error $e_3(t)$ by summing the commanded flow rate 101A with a negatived measurement or other determination of the actual flow rate 156A such as that measured by flow rate sensor 155. The output of stage 220 as $e_3(t)$ can then be processed by a first proportional-integral (PI) controller 222A having a gain $K_1$ for a proportional stage 222, and integral gain $K_{i1}$ for proportional stage 224, and integrating stage 226. The proportional and integral actions on error term $e_3(t)$ can then be positively summed by a fourth summing stage 228. The output of stage 228 as signal 102A can be the command signal to actuator 3 e.g. element 180 to actuate mixture flow control element 150. In a preferred embodiment combined stages 180 and 150 is a speed controlled positive displacement pump. Note flow rate determination 155 need not be a flow rate sensor. For example, the flow rate emerging from a positive displacement pump can be related to the number of strokes or revolutions per minute of the pump and therefore can be calculated rather than measured. One skilled in the art of pump flow determinations can readily appreciate such and other means of determining pump output without using a flow rate measuring sensor. Note also that although a PI controlling action is a preferred embodiment of stage 222A of the present innovations, other controlling actions as known to one skilled in the art of pump or flow control can be used in place of or in combination with the PI controlling action.

Figure 2C:
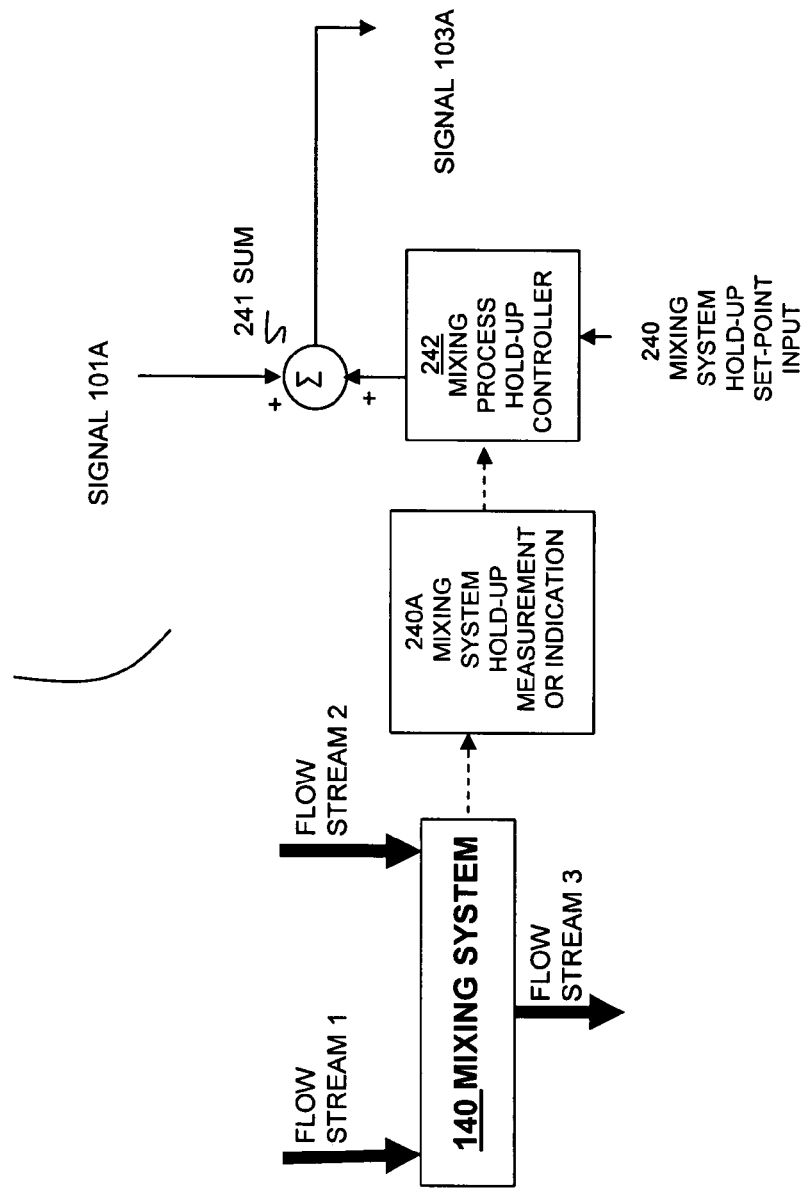
FIG. 2C shows a block diagram of one embodiment of the mixing process hold-up control systems and methods of the present innovations.

Turning now to FIG. 2C, a block diagram shows one embodiment of a control action 103 for the amount of hold-up of material in a mixing system such as mixing system 140.

Commanded virtual flow rate signal 101A can be fed to a fifth summing stage 241 which can sum signal 101A with the output of a mixing process hold-up controller 242. Stage 242 can be, for example, a proportional-integral-derivative (PID) liquid level controller in a mixing system, which has a set point input 240 and an indication or measurement of the amount of hold-up in the system as 240A, which acts to control the amount of liquid "held-up" in, for example, a mixing tank. For example, liquid level can be indicated by the height of a liquid level in a mix tank. Other controller actions as known to one skilled in the art of process control can be used. The general action of stage 103 is to maintain the hold-up in, for example, mixing system 140, by generating signal 103A to command stage 104 to increase or decrease the amount of total in-feed of materials 1 and 2. For examples of hold-up determinations in mixing systems, see U.S. patent application entitled "Methods and Systems for Estimating a Nominal Height or Quantity of a Fluid in a Mixing Tank While Reducing Noise", by Jason Dykstra and Justin Borgstadt, filed Jan. 4, 2005, application Ser. No. 11/029,072, Publication Number 20060161358, and U.S. patent application entitled "Process Control Architecture with Hydrodynamic Correction", by Jason Dykstra and Medhi Mazoorree, application Ser. Nos. 11/545,750 and 11/545,745.

Figure 2D:
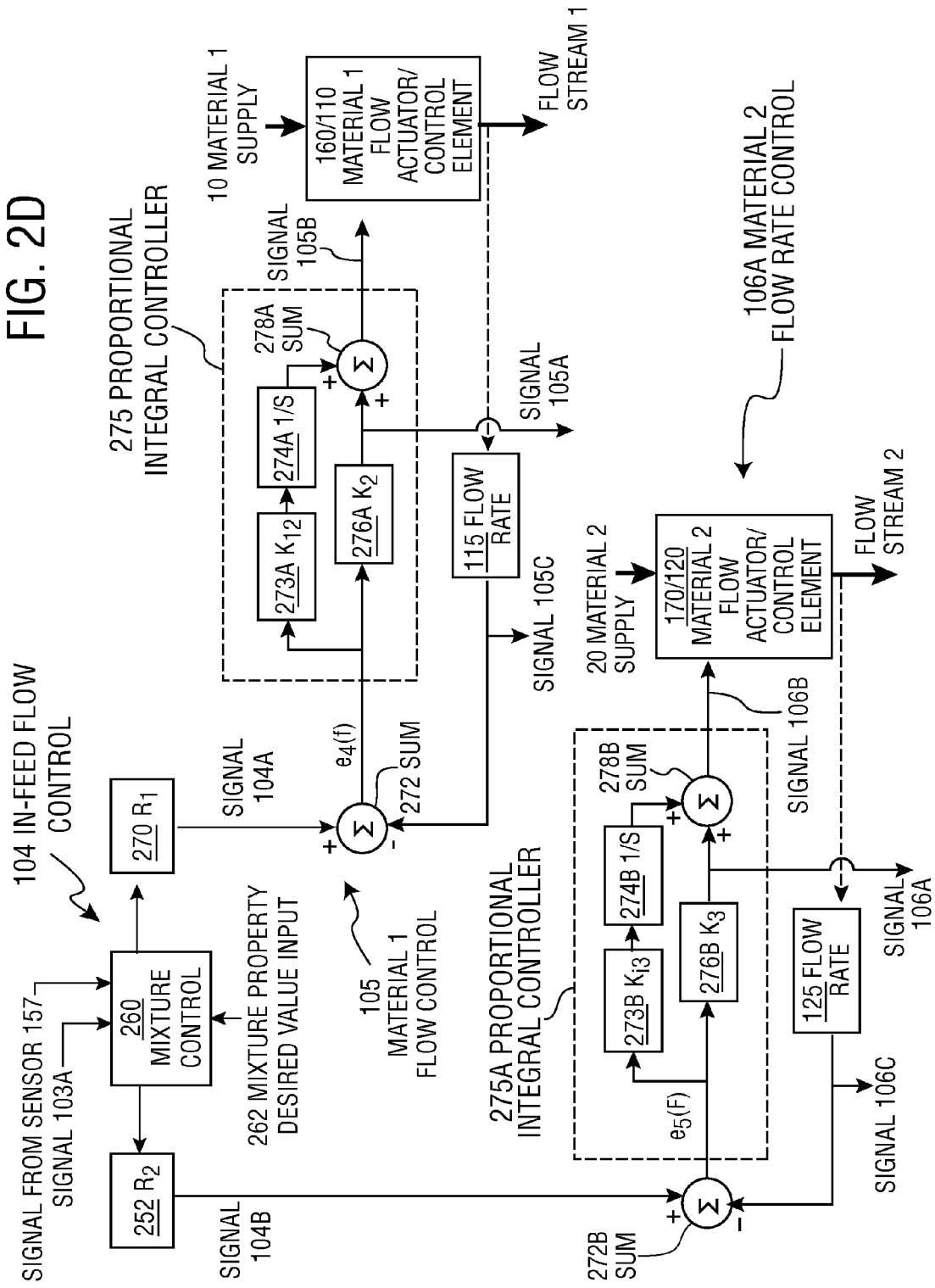
FIG. 2D shows a block diagram of one embodiment of the in-feed flow rate control systems and methods, systems and methods for flow rate control for a first material, systems and methods for flow rate control for a second material, all according to the present innovations.

Turning now to FIG. 2D, mixture control stage 260 can be used to effect both in-feed flow control and mixture property control by adjusting the relative proportions of material 1 and material 2 using flow modulators $R_1$ e.g. element 270 and $R_2$ e.g. element 252, respectively. See U.S. patent application Ser. Nos. 11/121,144, 11/121,278, and 11/121,325 as incorporated earlier in this application. The output of modulators 270 and 252, as signals 104A and 104B respectively, can be sent to material 1 flow rate control stage 105 and material 2 flow rate control stage 106A, respectively. A mixture property desired value input 262 can also be utilized by the mixture control stage 260 to effect the in-feed flow control and mixture property control.

For stage 105 as a preferred embodiment for control of flow of material 1, a signal 104A can be sent to a fifth summing stage 272 where it is summed with a negatived measurement of the flow rate of material 1 from flow rate determination stage 115. A fourth error term can be generated as $e_4(t)$ which can then be processed by a second proportional-integral (PI) controller 275 having a gain $K_2$ for a proportional stage 276A, and integral gain $K_{i2}$ for proportional stage 273A, and integrating stage 274A. The proportional and integral actions on error term $e_4(t)$ can then be positively summed by a sixth summing stage 278A. The output of stage 278A as signal 105B can be the command signal to actuator 160 to actuate material 1 flow control element 110 to control the flow rate of flow stream 1 being sourced from material supply 10. In a preferred embodiment stage 160/110 is an actuated control valve. Note flow rate determination 115 need not be a flow rate sensor as discussed previously. Note also that stage 105 can generate an output or indication of the flow rate of material 1 as signal 105C for later use in signal processing.

For stage 106A as one embodiment for control of flow of material 2, signal 104B can be sent to a sixth summing stage 273B where it is summed with a negatived measurement of the flow rate of material 2 from flow rate determination stage 125. A fifth error term can be generated as $e_5(t)$ which can then be processed by a third proportional-integral (PI) controller 275A having a gain $K_3$ for a proportional stage 276B, and integral gain $K_{i3}$ for proportional stage 273B, and integrating stage 274B. The proportional and integral actions on error term $e_5(t)$ can then be positively summed by a seventh summing stage 278B. The output of stage 278B as signal 106B can be the command signal to actuator 170 to actuate material 2 flow control element 120 to control the flow rate of flow stream 2 being sourced from material supply 20. Note that stage 106A can generate an output or indication of the flow rate of material 2 as signal 106C for later use. Note also that flow rate determination 125 need not be a sensed measurement.

Turning now to FIG. 2E for a preferred embodiment for flow control of material 2, a block diagram of a control system particularly suited for cement mixing is shown as material 2 flow rate control 106B (which can replace material 2 flow rate control stage 106A previously described.) When mixing dry cement powder (as material 2) and water as material 1, accurate control of density is a priority as previously described. However, accurate sensing of the flow rate of cement powder for feed back to, for example, stage 275A in stage 106A, can sometimes not be possible or easily accomplished. In-fact, sensor 125 may not be present at all in some systems. In such situations, an observer can be utilized to supply an indication of the missing flow rate measurement. In FIG. 2E, output signal 104B from modulator 252 $R_2$ can be fed to an alternative summing stage 254 for summing with a signal from observer which can be signal 294A in FIG. 2G. Summing stage 254 can generate an alternative error signal $e_{5\ ALTERNATIVE}(t)$ which can then drive material 2 flow (e.g. cement) actuator/control element 170/120. Note that stage 106B can generate an output or indication of the flow rate of material 2 as signal 106D which is an alternative to signal 106C from stage 106A.

Figure 2F:
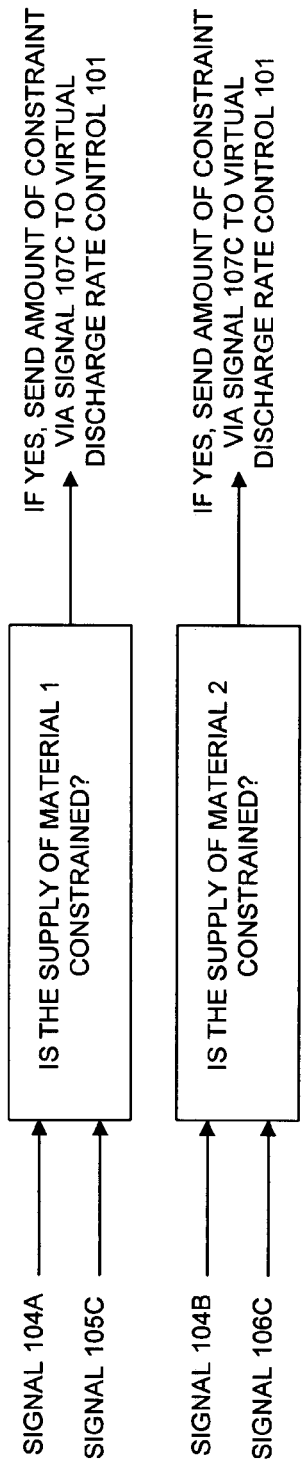
FIG. 2F shows a block diagram of one embodiment of systems and methods for the supply constraint checking stage for a first and a second material according to the present innovations.

Turning now to FIG. 2F, one embodiment as stage 107A of the stage 107 material flow rate supply constraint check is shown. For a check for constraint of supply for material 1, the commanded amount of material 1 as indicated by signal 104A from modulator 270 $R_1$ can be compared against the amount of material 1 flow actually achieved as indicated by signal 105C. If the flow achieved is less than the flow commanded using a signal processing technique to adjust for non-steady state conditions, then a signal can be sent to virtual flow rate control stage 101 regarding the amount of the constraint, to be included in signal 107C. Likewise, for a check for constraint of supply for material 2, the commanded amount of material 2 as indicated by signal 104B from modulator 252 $R_2$ can be compared against the amount of material 2 flow actually achieved as indicated by signal 106C. If the flow achieved is less than the flow commanded using a signal processing technique to adjust for non-steady state conditions, then a signal can be sent to virtual flow rate control stage 101 regarding the amount of the constraint, to be included in signal 107C.

Figure 2G:
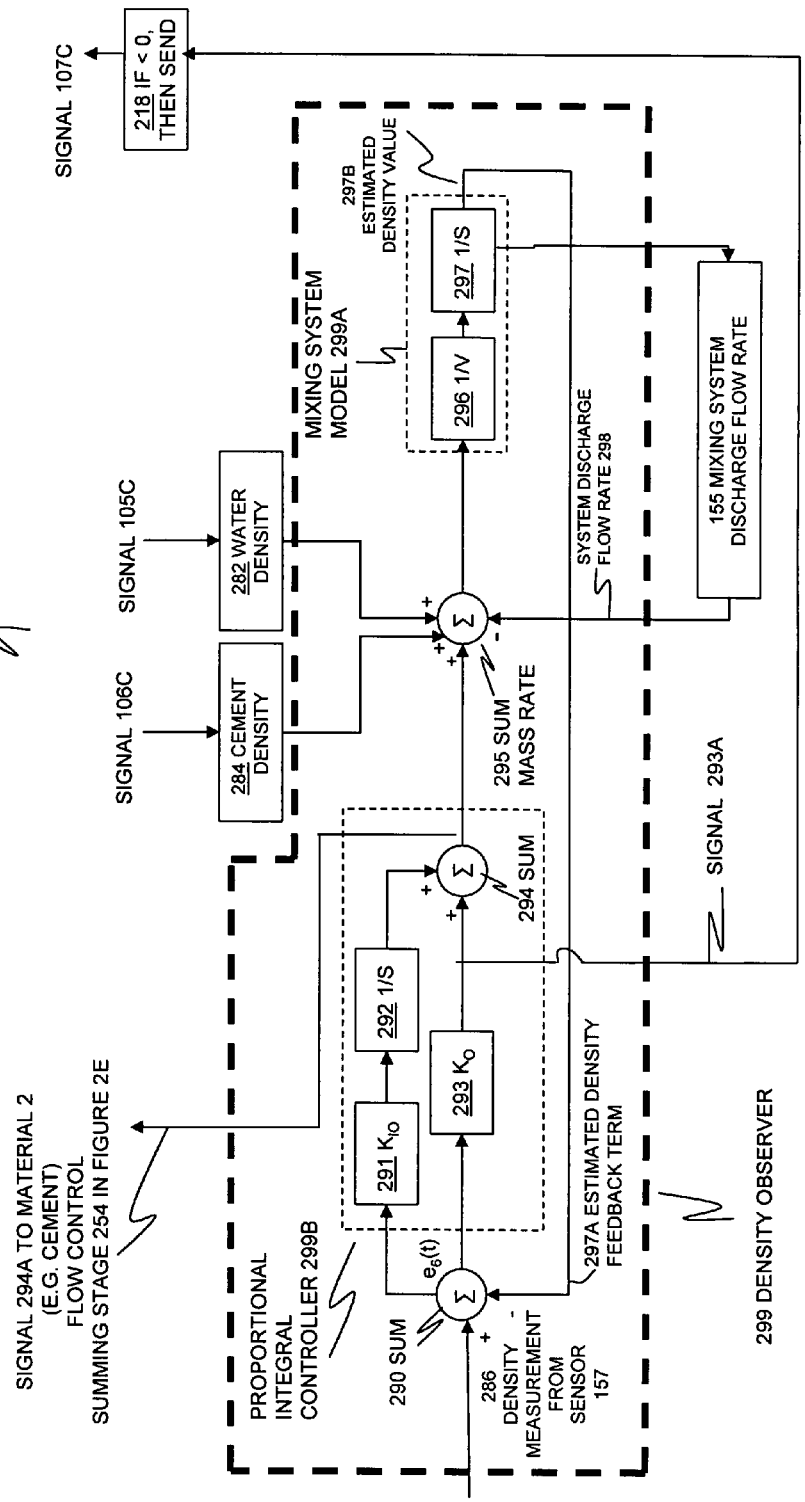
FIG. 2G shows a block diagram of a preferred embodiment of systems and methods for the supply constraint checking stage for a first and a second material according to the present innovations.

Turning now to FIG. 2G, a block diagram shows a preferred embodiment 107B of the stage 107 material flow rate supply constraint check of FIG. 1B. Note that FIG. 2G should be construed using FIG. 2E which uses material 2 flow rate control stage 106B, where in a preferred embodiment, dry cement as material 2 is being mixed with water and accurate density control is a priority. Note also that FIG. 2G is an embodiment of some of the innovations of U.S. patent application Ser. No. 11/121,144 for a density observer to estimate the actual density of a mixture comprising a proportional integral controller responsive to a density error determined by subtracting a feedback estimated density from a sensed density. In FIG. 2G, density observer 299 can include proportional integral controller 299B and mixing system model 299A for mixing system 140. An eighth summing stage 290 can negatively sum an estimated density feedback term 297A with a sensed density input 286 to determine a sixth error term $e_6(t)$. The error term can be processed by controller 299B having a gain $K_0$ for a proportional stage 293, an integral gain $K_{iO}$ for another proportioning stage 291, an integrating action stage 292, and a summing stage 294. The output of PI controller 299B, which conforms to a mass flow rate, can be fed to summing stage 295, to be positively summed with two density feed-forward inputs, from stages 282 and 284, and negatively summed with system discharge flow rate 298 which can be from flow determination stage 155. As taught in U.S. patent application Ser. No. 11/121,144, these signal inputs can represent the physical inputs into a mixing system as commanded in the preferred embodiment of the present innovations for cement by signal 106C and water for signal 105C, and for mixing system output such as flow stream 3 discharging from mixing system 140. The output of summing stage 295 can be processed by the mixing system model 299A. The mixing system model 299A can include a density estimate stage 296 estimating density by estimating the rate of change of the mass in the mixer and dividing it by the volume, this produces an estimate of the rate of change of density. Once this is integrated with stage 297 it produces an estimate of density. The output from rate of change of density stage 296 is fed to an integration stage 297 using a Laplace transform (1/s), with the output providing an estimated density value 297B for feedback to summing stage 290 as signal 297A. In FIG. 2G, density observer 299 can produce two outputs. A first output as signal 294A can be sent as an error signal for the density of the mixture to summing stage 254 in FIG. 2E. A second output as signal 107C can be sent as a supply constraint indication to virtual discharge rate control action 101 if the value of signal 293A is negative as checked in stage 218.

Figure 2H:
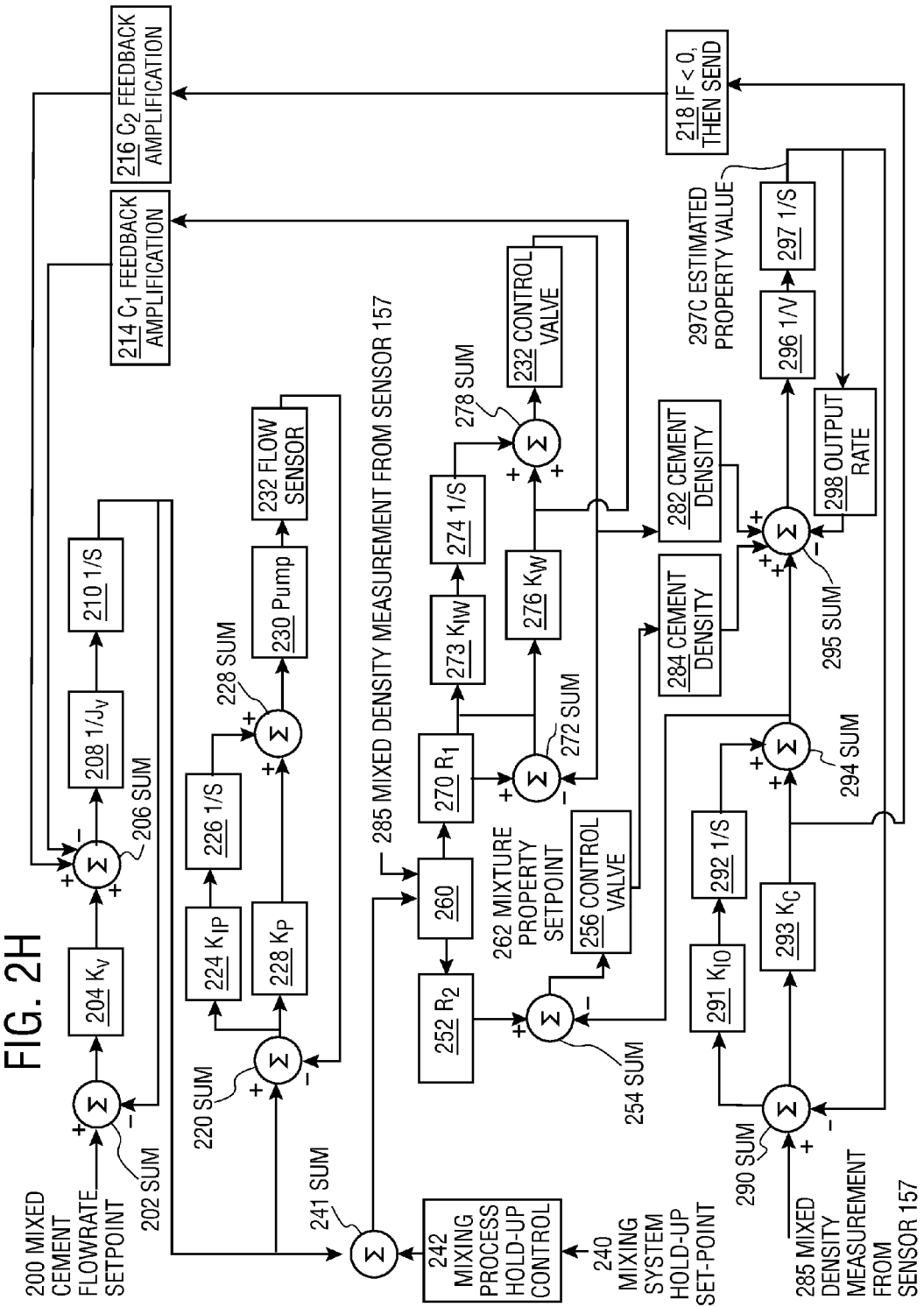
FIG. 2H shows a block diagram of a preferred embodiment of systems and methods of the present innovations where a first material is water and a second material is dry cement powder.

Turning now to FIG. 2H, a preferred embodiment of the present innovations is shown using an assembly and connection of the innovations detailed and described in FIGS. 2A, 2B, 2C, 2D, 2E, 2F, and 2G, for control actions 101, 102, 103, 104, 105, 106, and 107 as detailed in FIG. 1B, pertaining to control of water (i.e., material 1) and cement (i.e., material 2).

Summing stage 202 negatively sums the output from the integration stage 210 with a mixed cement flow rate setpoint 200 (i.e. discharge flowrate input) summed positively. This output can be processed at a "Proportional-Inertial-Integral" processing operation having a gain, $K_y$, for a proportional stage 204, an inertia constant $J_y$, for an inertial damping stage 208, and an integration stage 210, represented by 1/S inside the box, as is conventional in control system art to suggest integration. The output of stage 204 can be summed with amplified feedback $214C_1$ and from feedback amplification stage $216G_2$. Integration stage 210 outputs a commanded virtual flow rate signal for both feedback to summing stage 202 and feed-forward to summing stage 241 and 220 for positive summation.

The summation stage 220 positively sums the output integration stage 210 negatively with a measurement or other determination of the actual flow rate. The output of stage 220 can be processed by a proportional stage 222 having a gain Kp for and proportional stage 224 having a gain $K_{ip}$ for, and integrating stage 226. The proportional and integral actions can then be positively summed by summing stage 228. The output of stage 228 can be used as a command signal to pump 230, whose flow output can be measured by flow sensor 232 in one embodiment, and that flow output measuring signal can be used for feedback negative summation at summation stage 220. One skilled in the art of pump flow determinations can readily appreciate other means for determining pump output without using a flow rate measuring sensor 232. Note also that other controlling options as known to one skilled in the art of pump or flow control can be used in place of or in combination with the PI controlling action.

The output signal from integration stage 210 can be used at summing stage 241 to positively sum with the output of a mixing process hold-up controller 242. The mixing process hold-up controller 242 can be, for example, a proportional-integral-derivative (PID) liquid level controller in a mixing system. Stage 242 can have a set point input 240 and an indication or measurement of the amount of hold-up in the system, which can control the amount of liquid "held-up" in, for example, a mixing tank. Other controller options as known to one skilled in the art of process control can be used.

The output signal from stage 241 can be used along with a sensed density measurement 286 from mixed property sensor 157 and mixture property desired value setpoint 262 as inputs to mixture control stage 260 to effect both in-feed flow control and mixture property control by adjusting the relative proportions of material 1 and material 2 using flow modulators 270 $R_1$ and 252 $R_2$. The output of modulators 270 and 252, respectively, can be sent to summation stage 272 and summation stage 254 for positive summation.

At stage 272, the output signal from flow modulator 270 can be summed with a negatived measurement of the flow rate from control valve 280. The output from stage 272 can be processed at a "Proportional-Integral" processing operation and sent to proportional stage 276 having a gain $K_W$, and proportional stage 273 having a gain $K_{iw}$ and integrating stage 274. The proportional and integral actions can then be positively summed by summing stage 278. The output of stage 278 can be used as the command signal to control valve 280. The control valve 280 signal can be processed to provide a mass rate of water at stage 282.

At stage 254, the output signal from flow modulator 252 can be summed with a negatived measurement of the flow rate from summing stage 294. The output from stage 254 can used as an alternative error signal which can then drive cement control valve 256. The control valve 256 signal can be processed to provide a mass rate of cement at stage 284.

Summation stage 290 can negatively sum feedback estimated property value 299 with the sensed density measurement 286 from mixed property sensor 157. The output error term can be processed at proportional stage 293 having a gain $K_O$ and at another proportioning stage 291 having an integral gain $K_{iO}$, whose output goes to integrating stage 292. The output from stage 292 and 293 are positively summed at summing stage 294. The output from stage 294, which conforms to a mass flow rate, can be fed to summing stage 295, to be positively summed with two mass rate feed-forward inputs. These are two mass rate feed forward inputs, volumetric flow rate multiplied by density, from stages 282 for water and 284 for cement, and negatively summed with system output rate 298. The output of summing stage 295 can be processed by rate of density change 296 and then integration stage 297. Stage 296 takes the mass rate in the tub and divides it by the volume, producing the derivative of density, which is then integrated at 297 to produce the density estimate, providing an output of the density estimated property value 297C that can be used as a negative summation feedback to summing stage 290 and processed to provide an output rate at stage 298. The output from stage 293 can be sent as a supply constraint indication to the feedback amplification stage $216C_2$ if the value is negative as checked in stage 218.

Figure 3:
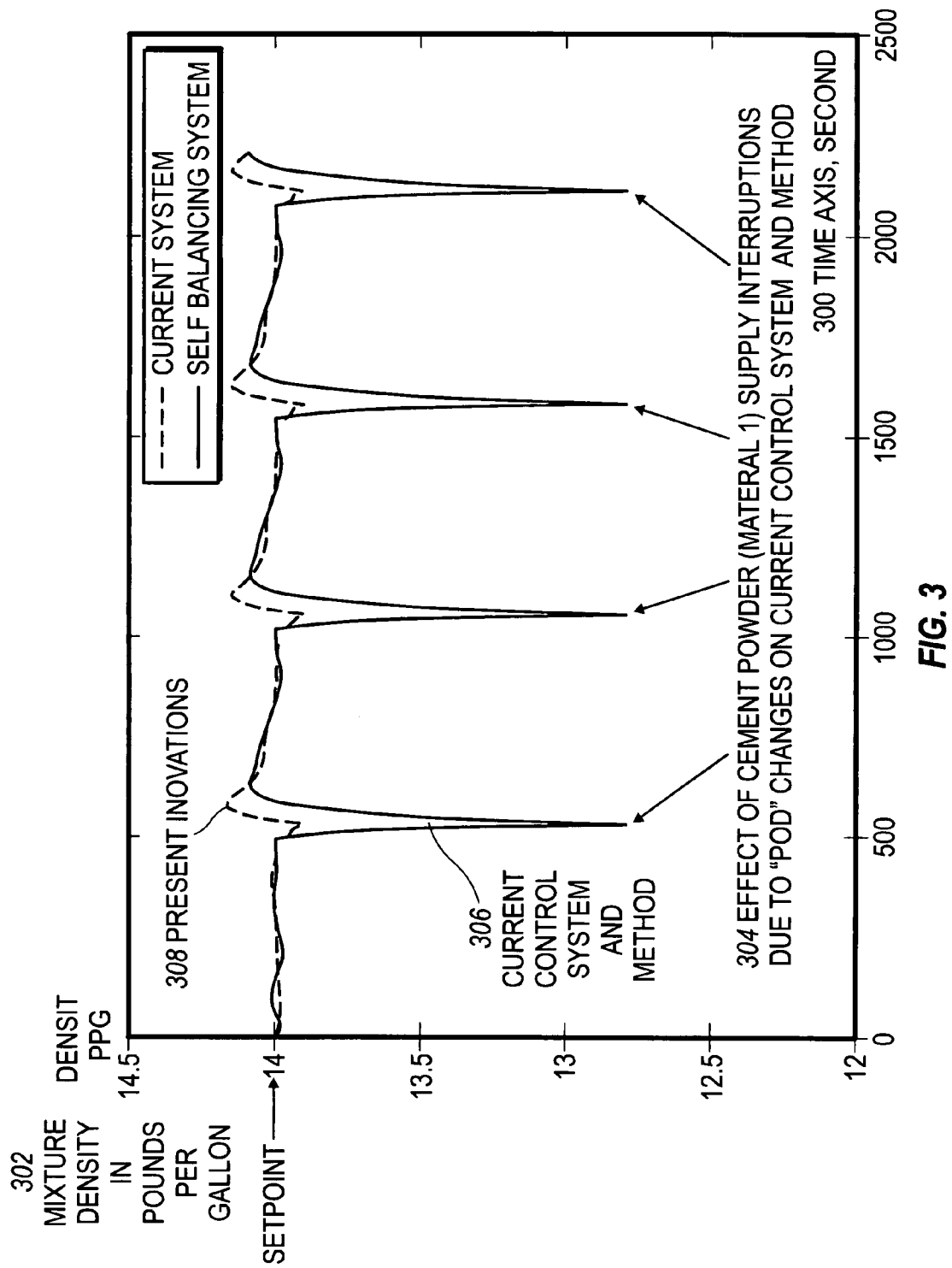
FIG. 3 is a graph of a simulation of cement density control versus time using the system and method of FIG. 2H applied to the physical plant of FIG. 1A compared against a current control method.
Figure 4:
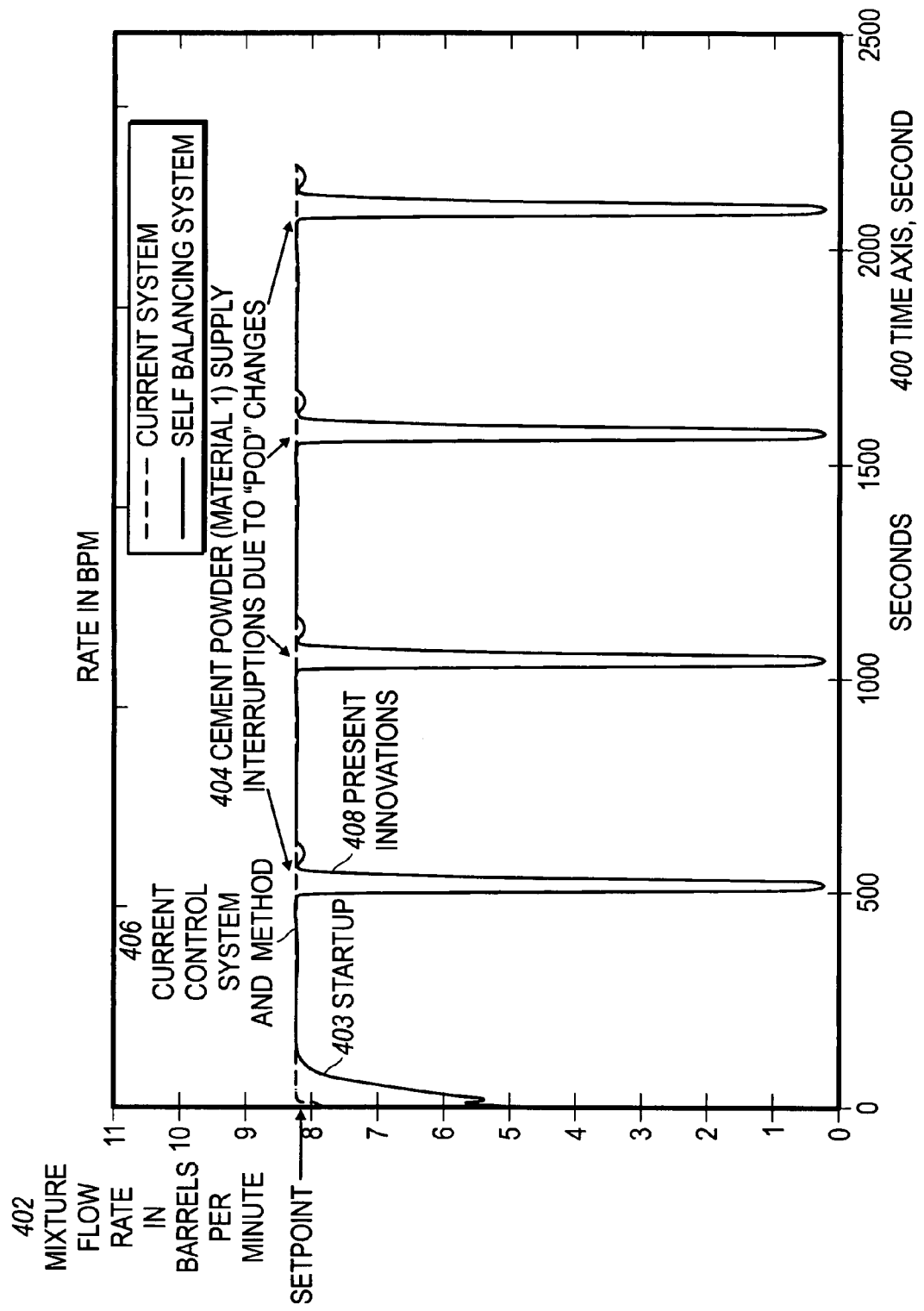
FIG. 4 is a graph of the simulation conducted for FIG. 3 showing of mixed cement discharge flow rate versus time using the system and method of FIG. 2H applied to the physical plant of FIG. 1A compared against a current control method.
Figure 5:
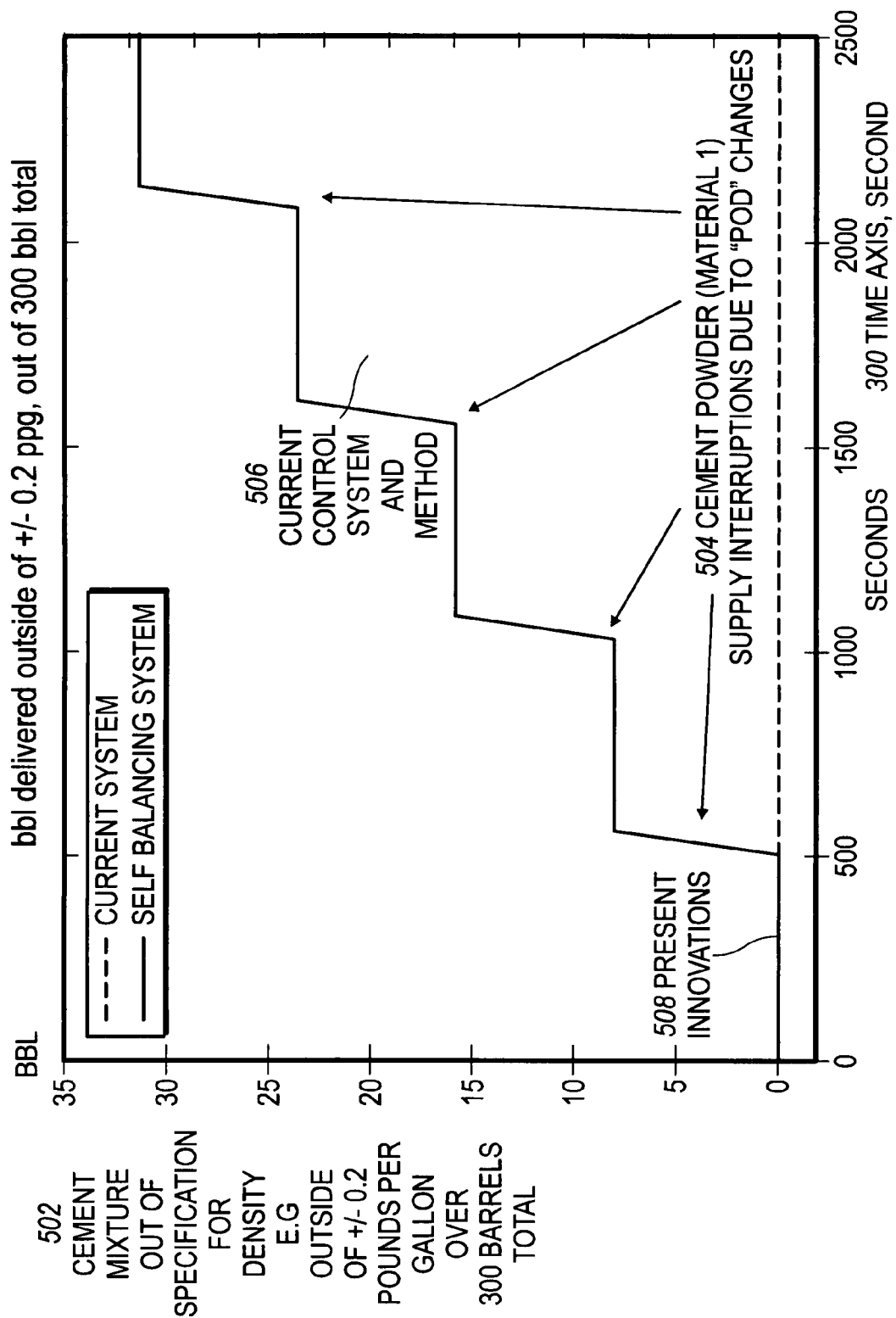
FIG. 5 is a graph of the simulation conducted for FIG. 3 showing the cumulative amount of out-of-specification mixed cement versus time using the system and method of FIG. 2H applied to the physical plant of FIG. 1A compared against a current control method.

Turning now to FIGS. 3, 4, and 5, the benefits of the present innovations as embodied in FIG. 2H are illustrated. The physical system of FIG. 1A was modeled in a control algorithm simulation program, "MATLAB", from The MathWorks, Inc., Natick, Mass., USA. The model design and parameters were as follows: a mixing process system was continuously fed dry cement powder and water, as material 2 and material 1, respectively, for a period of about 2500 seconds, to simulate mixing of cement for cementing of a well casing, to a desired set point density of 14 pounds per gallon. A simulated pump was used to discharge the mixing system into the well bore annulus at a desired set point flow rate of 8.2 barrels per minute. A conventional control system was simulated to control the in-feeds and the discharge. Current system data was simulated and is shown as current control system data 306 in FIG. 3, data 406 in FIG. 4, and data 506 in FIG. 5. In all three figures, the horizontal X-axis is the time axis in seconds. At approximately the 500, 1000, 1500, and 2000 second time points, an interruption to supply of cement powder was simulated to represent the cement "pods" being changed as previously described as occurring in actual operation of well cementing operations. These are shown as points 304, 404 and 504 on FIGS. 3, 4, and 5, respectively. The vertical Y-axis in the three figures vary. In FIG. 3, the X-axis shows data 302 mixture density in pounds per gallon. In FIG. 4, the X-axis shows data 402 mixture flow rate in barrels per minute. In FIG. 5, the X-axis shows data 502 cement mixture out of specification for density, e.g. outside of +/−0.2 pounds per gallon over 300 barrels total. In FIG. 4, the data shows the current method flow rate was maintained at the desired discharge flow rate of about 8.2 barrels per minute almost immediately upon start-up. Because the current method does not self-balance the mixing system discharge rate against quality results for the cement being mixed, the data shows that as the cement is being pumped down-hole, the flow rate stayed constant at 8.2 barrels per minute, even during the pod changes. FIG. 3 shows the simulated and calculated density results for the mixture being pumped down hole. For the current conventional control system, the data shows significant drops in density from the set point of 14 pounds per gallon, well beyond the specified tolerance for swings in density, which is usually set at about plus or minus 0.2 pounds per gallon. Because the flow of dry cement powder was interrupted at the pod changes, and because the dry powder has a higher specific density than that of water, the density dropped at the pod change points because supply of cement powder was constrained, and the density of the mixture began to approach the density of water, which is about 8.3 pounds per gallon. FIG. 5 shows the simulated accumulation of out-of-specification cement mixture over about 300 barrels of total mixed cement pumped. Thus, greater than 30 gallons total of off specification mix was pumped in the simulation, which is about 10% off quality for the total period. Next, a simulation model was built for control of the in-feed rates and the discharge rate using present innovations as embodied in FIG. 2H. Again, at about every 500 seconds, cement powder flow was simulated as being interrupted for a cement pod change. Results for the present innovations are shown as data 308, 408, and 508 in FIGS. 3, 4, and 5, respectively. In FIG. 4, the control system and methods according to the present innovations self-balanced the flow rate at the pod change points, by automatically slowing the discharge pumping rate in response to a detected supply constraint for dry cement powder during the simulated pod changes. FIG. 3 shows the simulated improvement in cement density control as data 308 where the density stays much nearer to the set-point of 14 pounds per gallon and within the cement density tolerance specification. FIG. 5 shows the simulated nil accumulation of off-quality cement pumped during the simulated period.

According to a disclosed class of innovative embodiments, there is provided a control system for continuously mixing at least two materials, comprising: a mixing process; wherein said process receives at least two input flow streams and has one output flow stream for the resulting mixture; and a process control system acting on said mixing process wherein said control system is configured to: (i) as a first priority, provide a desired density for said mixture; and (ii) as a lower priority, provide a desired flow rate for said mixture.

According to a disclosed class of innovative embodiments, there is provided a control system for continuously mixing at least two materials, comprising: (a) a first control element and a second control element, each operable to control the flow rate of an individual material feeding into a mixing process; (b) a third control element, operable to control the discharge flow rate from said mixing process; and (c) a control system connected to said control elements, comprising: (i) a first control stage for controlling the respective flow rates of individual materials feeding into a mixing process, with respect to a desired value of a property of the resulting mixture; and (ii) a second control stage for controlling the discharge flow rate from said mixing process in dependence on the difference between a sensed value and an estimated value for said property; wherein said difference can be due to a supply constraint of at least one of said individual materials; whereby the error between said desired value and said sensed value is reduced when said supply constraint occurs.

According to a disclosed class of innovative embodiments, there is provided a control system for continuously mixing at least two materials, comprising: (a) a first actuator and a second actuator, each operable to control the flow rate of an individual material feeding into a mixing process; (b) a third actuator, operable to control the discharge flow rate from said mixing process; and (c) a control system connected to said actuators; and configured to provide: (i) control of the respective flow rates of individual materials feeding into said mixing process, with respect to a desired value of the density of the resulting slurry; (ii) an estimate of the expected density of the mixed materials; wherein if the actual density of the mixed materials falls below the desired density, without corresponding change in any controlled variable, then said control system temporarily reduces the total flow rate through said process; whereby errors due to supply constraints on the dry material are temporarily ameliorated by reduced total flow; and (iii) a temporary reduction of said total flow rate if actuator response to commanded increases in supply flow of a liquid material component of the slurry is inadequate; whereby errors due to supply constraints on said liquid material are temporarily ameliorated by reduced total flow.

According to a disclosed class of innovative embodiments, there is provided a control system for continuously mixing at least two materials, comprising: (a) actuators and/or control elements for controlling the respective flow rates of individual materials feeding into a mixing process, based on a desired density for the resulting mixture; and (b) an actuator and/or a control element for controlling the discharge flow rate from said process, based on a master flow rate set point; and (c) a control system connected to said actuators and/or control elements for generating a master flow rate set point, based on: (i) the difference between a sensed value and an estimated value for said property; wherein said difference can be due to a supply constraint of at least one of said individual materials; and (ii) a desired discharge flow rate for said process.

According to a disclosed class of innovative embodiments, there is provided a control system for continuously mixing at least two materials, comprising: means for controlling the flow rates of materials into a mixing process; wherein said means provide control based on a desired density for the mixture resulting from said process; means for controlling the flow rate of the mixture discharging from said process; wherein said means provide control based on a master flow rate set point; means for detecting a material supply constraint for said materials flowing into said process; and means for generating said master flow rate set point; wherein said means generate said set point based on the occurrence of a said material supply constraint.

According to a disclosed class of innovative embodiments, there is provided a control system for continuously mixing water and cement, comprising: a cement mixing system, comprising: actuators which control the respective flow rates of water and cement into said mixing system with respect to a desired mixed cement density; and at least one pump for delivering the resulting wet mixed cement into a hydrocarbon well to thereby cement the casing to the well bore; wherein the flow rate generated by said pump is based on a desired pumping rate; and a control system which controls said actuators and said pump; wherein as a first priority, said control system operates to provide said desired density for said mixture.

MODIFICATIONS AND VARIATIONS

As will be recognized by those skilled in the art, the innovative concepts described in the present application can be modified and varied over a range of applications, and accordingly the scope of patented subject matter is not limited by any of the specific exemplary teachings given. It is intended to embrace all such alternatives, modifications, and variations that fall within the spirit and broad scope of the appended claims.

The methods and systems of the present application can operate across a wide range of hydrocarbon well service fluid provision situations and conditions. One of ordinary skill in the art, with the benefit of this disclosure, will recognize the appropriate use of the methods and systems for a chosen application of a given or dynamic set of operating parameters.

Optionally, the methods and systems of the present application can be configured or combined in various schemes. The combination or configuration depends partially on the required mixture property and discharge flow rate control precision and accuracy and the operational envelope of the mixing process system being utilized. One of ordinary skill in the art of process control, with the benefit of this disclosure, will recognize the appropriate combination or configuration for a chosen application.

Optionally, flags such as a particular process variable out of range which may define the reliability of the data or provide variables to use for process control. One of ordinary skill in the art, with the benefit of this disclosure, will recognize the appropriate additional measurements that would be beneficial for a chosen application.

Optionally, such measurements taken by the methods and systems of the present application may also be sent to an external system for further processing or use. For example, if operating conditions exceed a target by a certain amount, this fact could be used to re-tune process controllers. Or, for example, flow rates having a large standard deviation beyond a preset level might be used for the same flagging determination to re-tune flow rate controllers.

Optionally, temperature compensation can be employed used to adjust for shifts in density using reference data sets relating temperature change to total fluid density change, or curves fitted to such reference data.

Optionally, because the density changes of different fluid compositions or recipes can vary from application to application, or across different embodiments, different reference data sets or curves or models fitted to such data sets may be employed, maintained, or stored in control system 100 or an external system connected to control system 100. One of ordinary skill in the art, with the benefit of this disclosure, will recognize the appropriate systems to employ for such temperature compensation methods.

Figure 6:
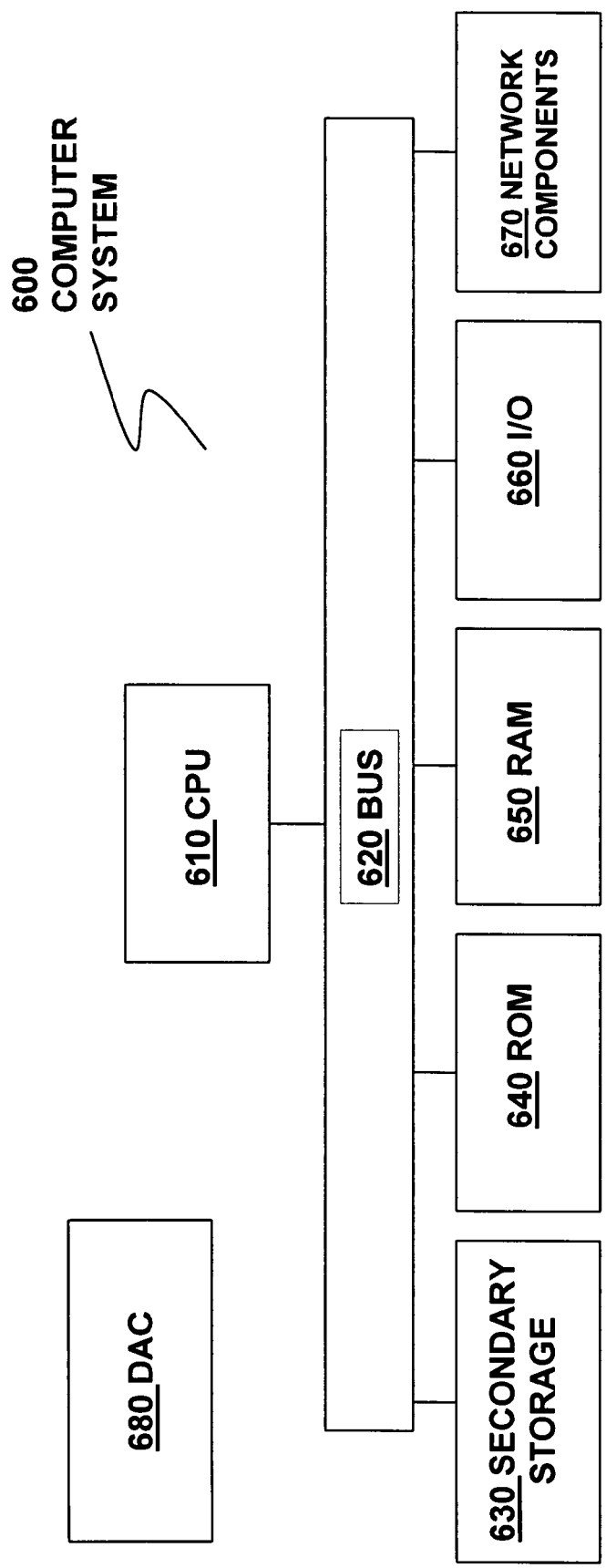
FIG. 6 illustrates one example of a general purpose computer system suitable for implementing the control systems and methods of the present innovations.

Optionally, the methods and systems of the present innovations can be implemented on general-purpose computers or laptop computer or microprocessor system, or an external computing and analysis system, in addition to being embodied in manufacturing control hardware, as long as such embodiments possess adequate computing resources, memory, and communication capacity to perform the necessary operations requested of them. FIG. 6 shows one embodiment of such a computer system 600 for implementing one or more embodiments of the methods and systems of the present innovations.

With respect to FIG. 6, system 600 includes central processor unit (CPU) 610 which can communicate with various system devices via communications BUS 620.

Optionally, CPU 610 can execute codes, instructions, programs, and scripts which it accesses from various disk based systems which can be secondary storage 630, ROM 640, RAM 650, or the network communication components 670.

Optionally, the set of instructions to CPU 610 can comprise input instructions that receives data or models from an external system.

Optionally, system 600 can have more than one CPU chip to increase computing power and resources.

Optionally, various system devices can include memory devices such as secondary storage 630, read only memory (ROM) 640, random access memory (RAM) 650. System 600 can connect to other systems such as the systems of the present innovations via input/output (I/O) components 660 and network or communication components 670.

Optionally, the signal outputs from system 600 to actuators and flow control elements can be converted from a digital to an analog signal by a digital to analog converter (DAC) 680.

Optionally, additional signal conditioning can be conducted on system 600 output signals to appropriately communicate with various control elements and actuators.

Optionally, secondary storage 630 can comprise one or more disk drives or tape drives for permanent storage of data and as extra memory if RAM 650 is not of sufficient capacity for a given operation. Secondary storage 630 can store programs that are loaded into RAM 650 if such programs are selected for running.

Optionally, ROM 640 can store instructions and data that can be read during the running of programs. ROM 640 is a non-volatile memory device.

Optionally, RAM 650 can be used to store data and to store computing instructions. Speed of access to ROM 640 and RAM 650 can be faster than to secondary storage 630.

Optionally, input/output components 660 can include video monitors, printers, touch screen displays, liquid crystal display, keyboards, keypads, on-off buttons, dials, mouse pointing devices, track balls, voice recognizers, card readers, tape readers, and various combinations thereof.

Optionally, network communications components 670 can be ethernet cards, universal serial bus interface cards, serial interfaces, token ring cards, fiber distributed data interface cards, modems, modem banks, wireless local area network cards, radio transceiver cards such as "Global System for Mobile Communications" radio transceiver cards, and various combinations thereof.

Optionally, components 670 can enable CPU 610 to communicate with an Internet or with intranets. In such communications, CPU 610 can receive information from the nets, or can output information to the nets. Such information can be a computer data signal embodied in a carrier wave or a baseband signal. The baseband signal or signal embedded in a carrier wave, or other types of signals currently used or hereafter developed, can be generated according to several methods well known to one skilled in the art.

Optionally, for digital communications, RS-422 or RS-485 can be used to allow links to control system 100 of FIG. 1A or to an external computing and analysis system, or to multiple external units.

Optionally, a 4-20 milliamp analog output signal can be used to allow external processing of the system measurements.

Optionally, the methods of the present invention can be embodied in a computer readable medium, including a compact disk.

None of the description in the present application should be read as implying that any particular element, step, or function is an essential element which must be included in the claim scope: THE SCOPE OF PATENTED SUBJECT MATTER DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

What is claimed is:

1. A control system for continuously mixing at least two materials, comprising:
   a mixing process; wherein said process receives at least two input flow streams and has one output flow stream for the resulting mixture; and
   a process control system acting on said mixing process wherein said control system is configured to:
     (i) as a first priority, provide a desired density for said mixture; and
     (ii) as a lower priority, provide a desired flow rate for said mixture.

2. The system of claim 1 wherein said mixing process prepares a wet cement slurry at a hydrocarbon well site; wherein said wet cement is pumped down-hole to cement a well casing to a well bore.

3. The system of claim 1, wherein said materials are selected from the group consisting of water, sea water, re-used process water, carrier fluid, dry cement material, sand, fluid rheology modifying materials, cement property modifying materials, cement accelerators, fracturing fluids, proppant fluids, acidizing fluids, flushing fluids, drilling mud components, gases, and proppants, or various combinations thereof.

4. A control system for continuously mixing at least two materials, comprising:
   (a) a first control element and a second control element, each operable to control the flow rate of an individual material feeding into a mixing process;
   (b) a third control element, operable to control the discharge flow rate from said mixing process; and
   (c) a control system connected to said control elements, comprising:
     (i) a first control stage for controlling the respective flow rates of individual materials feeding into a mixing process, with respect to a desired value of a property of the resulting mixture; and
     (ii) a second control stage for controlling the discharge flow rate from said mixing process in dependence on the difference between a sensed value and an estimated value for said property; whereby said difference can be due to a supply constraint of at least one of said individual materials; wherein the error between said desired value and said sensed value is reduced when said supply constraint occurs.

5. The system of claim 4, wherein said control stage (ii) also controls said discharge rate based on a desired discharge flow rate from said mixing process.

6. The system of claim 4, wherein said estimated value for said property is a density value generated by either a density observer or a volumetric observer.

7. The system of claim 4, wherein the total flow rate of materials into said mixing process is controlled based on the hold-up of materials in said mixing process.

8. The system of claim 7, wherein a height observer is used to estimate said hold-up of said mixing process.

9. The system of claim 4, wherein said property of said mixture is selected from the group consisting of density, material volume ratio, and weight or volume fraction of a material in the mixture, or various combinations thereof.

10. The system of claim 4, wherein said controlling actions (i) and (ii) uses actuators to operate said control elements; wherein said actuators are selected from the group consisting of variable speed motors, variable speed drives, pneumatic actuators, electrical actuators, hydraulic actuators, rotary actuators, servo motor actuators, or various combinations thereof.

11. The system of claim 4 wherein the first and second control elements are flow control valves and the third control element is a pump.

12. The system of claim 11 wherein said flow control valves are selected from the group consisting of a rotary-actuated control valve, a vertically-actuated control valve, an actuated metering valve, an actuated gate valve, an actuated ball valve, an actuated globe valve, an actuated diaphragm valve, a variable rate dump valve, a rotary valve, a rotary vane valve, a rotary pocket valve, a variable rate slide gate valve, or various combinations thereof.

13. The system of claim 11 wherein said pump is selected from the group of pumps consisting of a centrifugal pump, a positive displacement pump, a progressive cavity pump, a piston pump, a gear pump, a diaphragm pump, a stuffing pump, and a gas compressor.

14. A control system for continuously mixing at least two materials, comprising:
   (a) a first actuator and a second actuator, each operable to control the flow rate of an individual material feeding into a mixing process;
   (b) a third actuator, operable to control the discharge flow rate from said mixing process; and
   (c) a control system connected to said actuators; and configured to provide:
     (i) control of the respective flow rates of individual materials feeding into said mixing process, with respect to a desired value of the density of the resulting slurry;
     (ii) an estimate of the expected density of the mixed materials; wherein if the actual density of the mixed materials falls below the desired density, without corresponding change in any controlled variable, then said control system temporarily reduces the total flow rate through said process; whereby errors due to supply constraints on the dry material are temporarily ameliorated by reduced total flow; and
     (iii) a temporary reduction of said total flow rate if actuator response to commanded increases in supply flow of a liquid material component of the slurry is inadequate; whereby errors due to supply constraints on said liquid material are temporarily ameliorated by reduced total flow.

15. The system of claim 14, wherein the control of said total flow rate is also based on a desired total flow rate through said mixing process.

16. The system of claim 14, wherein said estimated value for said density is generated by a density observer or a volumetric observer.

17. The system of claim 14, wherein the total flow rate of materials into said mixing process is controlled based on the hold-up of materials in said mixing process.

18. The system of claim 17, wherein a height observer is used to estimate said hold-up of said mixing process.

19. A control system for continuously mixing at least two materials, comprising:
   (a) actuators and/or control elements for controlling the respective flow rates of individual materials feeding into a mixing process, based on a desired density for the resulting mixture;
   (b) an actuator and/or a control element for controlling the discharge flow rate from said process, based on a master flow rate set point; and
   (c) a control system connected to said actuators and/or control elements for generating a master flow rate set point, based on:
      (i) the difference between a sensed value and an estimated value for said property; wherein said difference can be due to a supply constraint of at least one of said individual materials; and
      (ii) a desired discharge flow rate for said process.

20. The system of claim 19, wherein said estimated value for said density is generated by a density observer or a volumetric observer.

21. The system of claim 19, wherein the total flow rate of materials into said mixing process is controlled based on the hold-up of materials in said mixing process.

22. The system of claim 21, wherein a height observer is used to estimate said hold-up of said mixing process.

23. The system of claim 19, wherein the master flow rate set point is generated based on:

(iii) the proportional drive signal for a liquid material flow control valve.

24. The system of claim 19, wherein the rate of change of said master flow rate set-point is limited to a value no greater than the lesser of:
   (i) the maximum possible rate of change of the total in-feed flow rate of said materials; and
   (ii) the maximum possible rate of change of said discharge flow rate.

25. A control system for continuously mixing at least two materials, comprising:
   means for controlling the flow rates of materials into a mixing process; wherein said means provide control based on a desired density for the mixture resulting from said process;
   means for controlling the flow rate of the mixture discharging from said process; wherein said means provide control based on a master flow rate set point;
   means for detecting a material supply constraint for said materials flowing into said process; and
   means for generating said master flow rate set point; wherein said means generate said set point based on the occurrence of a said material supply constraint.

26. A control system for continuously mixing water and cement, comprising:
   a cement mixing system, comprising:
      actuators which control the respective flow rates of water and cement into said mixing system with respect to a desired mixed cement density; and
      at least one pump for delivering the resulting wet mixed cement into a hydrocarbon well to thereby cement the casing to the well bore; wherein the flow rate generated by said pump is based on a desired pumping rate; and
   a control system which controls said actuators and said pump; wherein as a first priority, said control system operates to provide said desired density for said mixture.

* * * * *